(12) United States Patent
Milani

(10) Patent No.: US 10,414,491 B2
(45) Date of Patent: Sep. 17, 2019

(54) VTOL AIRCRAFT WITH TILTABLE PROPELLERS

(71) Applicant: Kazem Milani, Tehran (IR)

(72) Inventor: Kazem Milani, Tehran (IR)

( * ) Notice: Subject to any disclaimer, the term of this patent is extended or adjusted under 35 U.S.C. 154(b) by 0 days.

(21) Appl. No.: 15/521,896

(22) PCT Filed: Nov. 26, 2015

(86) PCT No.: PCT/IB2015/059149
§ 371 (c)(1),
(2) Date: May 4, 2017

(87) PCT Pub. No.: WO2016/110756
PCT Pub. Date: Jul. 14, 2016

(65) Prior Publication Data
US 2018/0029704 A1 Feb. 1, 2018

(30) Foreign Application Priority Data
Mar. 29, 2015 (WO) .................. PCT/IB2015/052314

(51) Int. Cl.
*B64C 27/20* (2006.01)
*B64C 29/00* (2006.01)

(52) U.S. Cl.
CPC .......... *B64C 29/0033* (2013.01); *B64C 27/20* (2013.01)

(58) Field of Classification Search
CPC ............................ B64C 29/0033; B64C 27/20
USPC ........................................................ 244/7 R
See application file for complete search history.

(56) References Cited

U.S. PATENT DOCUMENTS

| 1,794,202 | A  | * | 2/1931  | Pickard ............... B64C 29/0033 244/66 |
| 8,646,720 | B2 | * | 2/2014  | Shaw .................. B64C 29/0025 244/17.23 |
| 9,682,772 | B2 | * | 6/2017  | Yoon ......................... B60F 5/02 |
| 10,053,213 | B1 | * | 8/2018  | Tu ............................ B64C 27/26 |
| 2008/0048065 | A1 | * | 2/2008  | Kuntz .................... A63H 17/00 244/17.23 |
| 2009/0008499 | A1 | * | 1/2009  | Shaw ...................... B64C 27/20 244/17.23 |
| 2015/0298800 | A1 | * | 10/2015 | Yoon ......................... B60F 5/02 244/2 |
| 2015/0360776 | A1 | * | 12/2015 | Briod ....................... B64C 17/00 244/23 A |
| 2016/0347447 | A1 | * | 12/2016 | Judas .................. B64C 29/0033 |
| 2017/0057630 | A1 | * | 3/2017  | Schwaiger ............. B64C 3/385 |
| 2017/0217584 | A1 | * | 8/2017  | Elfeky ............... B64C 29/0033 |
| 2017/0240273 | A1 | * | 8/2017  | Yuen .................. B64C 29/0033 |
| 2018/0002026 | A1 | * | 1/2018  | Oldroyd ................. B64D 27/12 |

\* cited by examiner

*Primary Examiner* — Christopher P Ellis

(57) ABSTRACT

Disclosed herein is a vertical take-off and landing (VTOL) aircraft. The vertical take-off and landing aircraft includes a single wing, a plurality of engines, a first set of propellers on a first side of the single wing, a second set of propellers on a second side of the single wing, a first power transfer unit, a second power transfer unit, landing gears connected to the single wing, and a fuselage with a capacity of 100 passengers connected to the single wing. The plurality of engines includes a first engine mounted to the first side of the single wing and a second engine mounted to the second side of the single wing.

20 Claims, 33 Drawing Sheets

VTOL AIRCRAFT WITH TILTABLE PROPELLERS

TECHNICAL FIELD

The present disclosure generally relates to aircrafts, and particularly to a Vertical take-off and landing (VTOL) aircraft, and more particularly to a vertical take-off and landing airplane that is able to hold and carry up to 100 passengers.

BACKGROUND

A vertical take-off and landing (VTOL) aircraft is one that can hover, take off, and land vertically. This classification can include a variety of types of aircraft including fixed-wing aircraft as well as helicopter and other aircraft with powered rotors. Some VTOL aircrafts can operate in other modes as well, such as CTOL (conventional take-off and landing), STOL (short take-off and landing) and/or STOVL (short take-off and vertical landing). Others, such as some helicopters can only operate by VTOL. Some lighter-than-air aircrafts also qualify as a VTOL aircraft, as they can hover, take off, and land with vertical approach/departure profiles.

A current typical example of vertical take-off and landing (VTOL) aircraft capable of generating lift without running on the ground is a helicopter. A helicopter has a large rotor, compared with its fuselage, and generates lift and thrust through rotating the rotor. Helicopters may be associated with some issues. For example, a fuselage of a helicopter has a relatively large size itself, and in addition, the helicopter is equipped with a main rotor larger in size than the fuselage and a tail rotor at the tail of the fuselage. Thus, if take-off, landing, or altitude control of a helicopter is performed in a small space surrounded by obstacles such as buildings or trees, the main rotor or the tail rotor may come into contact with the obstacles. Accordingly, a large space may be needed for the take-off and landing. Furthermore, helicopters can seat at most 30 passengers inside the cabin. There have also been known, though few in number of types, there is a fighter aircraft that perform vertical take-off and landing through changing the direction of the thrust derived from jet engines. The fuselage of a helicopter has a relatively large size itself, and in addition, the helicopter is equipped with a main rotor larger in size than the fuselage and a tail rotor at the tail of the fuselage. Thus, if take-off, landing, or altitude control of a helicopter is performed in a small space surrounded by obstacles such as buildings or trees, the main rotor or the tail rotor may come into contact with the obstacles. Accordingly, a large space may be needed for the take-off and landing. Furthermore, helicopters can seat at most 30 passengers inside the cabin.

A fighter aircraft capable of vertically taking off and landing uses a jet engine which emits high temperature jet exhaust with a large amount of jet exhaust, and thus people cannot be close to the fighter aircraft when taking off and landing. In addition small objects such as stones are blown off by the jet exhaust during take-off or landing, possibly damaging surrounding buildings or the like. Thus, also in the case of the fighter aircraft, a large space may be needed for the take-off and landing.

In light of this, there have been proposed some vertical take-off and landing (VTOL) aircrafts capable of safe take-off and landing even in a small space. However, proposed vertical take-off and landing (VTOL) aircrafts suffer from a number of limitations. For example significant vibration during flight is generated in wings and this vibration is transferred to the fuselage. On the other hand, aircrafts may carry avionics in their fuselage which are sensitive to vibration. Vibrations experienced by these avionics can negatively impact their lifetime. Furthermore, a vibration in the fuselage may cause the feeling of discomfort, anxiety, and stress for the passengers and may also negatively affect their health.

Furthermore, these vertical take-off and landing (VTOL) aircrafts may be further associated with some issues such as infeasibility, high production cost, and high flight cost. In other words, due to many obstacles, they have not been able to be developed and built. Some of the most important reasons are the high cost of design, high cost of production, and high cost of maintenance. Furthermore these vertical take-off and landing (VTOL) aircrafts have a limitation in number of passengers they can carry.

There is, therefore, a need for a vertical take-off and landing (VTOL) aircraft that reduces vibrations in aircrafts wings and prevents the vibrations transfer to the fuselage. Furthermore, there is a need for a vertical take-off and landing (VTOL) airplane with an ability to hold and carry up to 100 passengers that have a low flight cost and is able to be built and developed with a relatively low cost of design, production, and maintenance.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

Disclosed herein is a vertical take-off and landing (VTOL) aircraft with the ability to hold and carry up to 100 passengers. In an exemplar) embodiment, the disclosed vertical take-off and landing (VTOL) aircraft may be equipped with a single integrated wing rather than two lateral separated wings exist in typical airplanes. In an exemplary embodiment, the disclosed vertical take-off and landing aircraft may include a single wind made of spars, ribs and sheet metal.

In one or more exemplary embodiments, the vertical take-off and landing aircraft may further include a plurality of engines. In an exemplary embodiment, the plurality of engines may include a first engine mounted to a first side of the single wing. In an exemplary embodiment, the plurality of engines may further include a second engine mounted to a second side of the single wing.

In one or more exemplary embodiments, the vertical take-off and landing aircraft may further include a first set of propellers on the first side of the single wing. In an exemplary embodiment, the vertical take-off and landing aircraft may further include a second set of propellers on the second side of the single wing.

In one or more exemplary embodiments, the vertical take-off and landing aircraft may further include a first power transfer unit. In an exemplary embodiment, the first power transfer unit may include a first taper tube assembly. In an exemplary embodiment, the first taper tube assembly may be connected to a first propeller of the first set of propellers and a first power shaft of the first engine. In an exemplary embodiment, the first power transfer unit may further include a second taper tube assembly. In an exemplary embodiment, the second taper tube assembly may be connected to a second propeller of the first set of propellers and a first shaft assembly connected to the first power shaft.

In one or more exemplary embodiments, the vertical take-off and landing aircraft may further include a second power transfer unit. In an exemplary embodiment, the second power transfer unit may include a third taper tube assembly. In an exemplary embodiment, the third taper tube assembly may be connected to a third propeller of the second set of propellers and a second power shaft of the second engine. In an exemplary embodiment, the second power transfer unit may further include a fourth taper tube assembly. In an exemplary embodiment, the fourth taper tube assembly may be connected to a fourth propeller of the second set of propellers and a second shaft assembly connected to the second power shaft.

In one or more exemplary embodiments, the vertical take-off and landing airplane may further include a fuselage with a capacity of 100 passengers connected to the single wing. In an exemplary embodiment, the fuselage may include an auxiliary power unit (APU). In an exemplary embodiment, the auxiliary power unit may be configured to provide electrical and pneumatic energy to the vertical take-off and landing airplane.

In one or more exemplary embodiments, the first engine may be mounted to the first side of the single wing via a first pylon. In an exemplary embodiment, the first pylon may include a first shock damper system. In an exemplary embodiment, the first pylon may be configured to suppress vibrations of the first engine on the single wing.

In one or more exemplary embodiments, the second engine may be mounted to the second side of the single wing via a second pylon. In an exemplary embodiment, the second pylon may include a second shock damper system. In an exemplary embodiment, the second pylon may be configured to suppress vibrations of the second engine on the single wing.

In one or more exemplary embodiments, the fuselage may be connected to the single wing via a pylon. In an exemplary embodiment, the pylon may include a shock damper system.

In an exemplary embodiment, the pylon may be configured to suppress vibrations of the single wing on the fuselage. In an exemplary embodiment, the pylon may be configured to suppress vibrations of the single wing on the fuselage.

In an exemplary embodiment, the first engine of the plurality of engines may include a first turboshaft engine. In an exemplary embodiment, the second engine of the plurality of engines may include a second turboshaft engine.

In one or more exemplary embodiments, the first taper tube assembly may include a first gearbox, a second gearbox, a first inner shaft, a first stepper motor, and one or more first brakes. In an exemplary embodiment, the first gearbox may be connected to the first power shaft of the first engine. In an exemplary embodiment, the second gearbox may be connected to the first propeller.

In an exemplary embodiment, the first inner shaft may be comprised within the first taper tube. In an exemplary embodiment, the first inner shaft may be connected to the first gearbox and the second gearbox. In an exemplary embodiment, the first gearbox, the second gearbox, and the first inner shaft may be configured to transfer power from the first power shaft of the first engine to the first propeller in order to run the first propeller.

In an exemplary embodiment, the first stepper motor may be configured to control a first tilt angle of the first propeller by controlling a first angular position of the first taper tube.

In an exemplary embodiment, the one or more first brakes may be configured to secure the first angular position of the first taper tube.

In one or more exemplary embodiments, the second taper tube assembly may include a second taper tube, a third gearbox, a fourth gearbox, a second inner shaft, a second stepper motor, and one or more second brakes. In an exemplary embodiment, the third gearbox may be connected to the first shaft assembly. In an exemplary embodiment, the fourth gearbox may be connected to the second propeller.

In an exemplary embodiment, the second inner shaft may be comprised within the second taper tube. In an exemplary embodiment, the second inner shaft may be connected to the third gearbox and the fourth gearbox. In an exemplary embodiment, the third gearbox, the fourth gearbox, and the second inner shaft may be configured to transfer power from the first shaft assembly to the second propeller in order to run the second propeller.

In an exemplary embodiment, the second stepper motor may be configured to control a second tilt angle of the second propeller by controlling a second angular position of the second taper tube. In an exemplary embodiment, the one or more second brakes may be configured to secure the second angular position of the second taper tube.

In an exemplary embodiment, the third taper tube assembly may include a third taper tube, a fifth gearbox, a sixth gearbox, a third inner shaft, a third stepper motor, and one or more third brakes. In an exemplary embodiment, the fifth gearbox may be connected to the second power shaft of the second engine. In an exemplary embodiment, the sixth gearbox may be connected to the third propeller.

In an exemplary embodiment, the third inner shaft may be comprised within the third taper tube. In an exemplary embodiment, the third inner shaft may be connected to the fifth gearbox and the sixth gearbox. In an exemplary embodiment, the fifth gearbox, the sixth gearbox, and the third inner shaft may be configured to transfer power from the second power shaft of the second engine to the third propeller in order to run the third propeller.

In an exemplary embodiment, the third stepper motor may be configured to control a third tilt angle of the third propeller by controlling a third angular position of the third taper tube. In an exemplary embodiment, the one or more third brakes may be configured to secure the third angular position of the third taper tube.

In one or more exemplary embodiments, the fourth taper tube assembly may include a fourth taper tube, a seventh gearbox, an eight gearbox, a fourth inner shaft, a fourth stepper motor, and one or more fourth brakes. In an exemplary embodiment, the seventh gearbox may be connected to the second shaft assembly. In an exemplary embodiment, the eight gearbox may be connected to the fourth propeller.

In an exemplary embodiment, the fourth inner shaft may be comprised within the fourth taper tube. In an exemplary embodiment, the fourth inner shaft may be connected to the seventh gearbox and the eighth gearbox. In an exemplary embodiment, the seventh gearbox, the eighth gearbox, and the fourth inner shaft may be configured to transfer power from the second shaft assembly to the fourth propeller in order to run the fourth propeller.

In an exemplary embodiment, the fourth stepper motor may be configured to control a fourth tilt angle of the fourth propeller by controlling a fourth angular position of the fourth taper tube. In an exemplary embodiment, the one or more fourth brakes may be configured to secure the fourth angular position of the fourth taper tube.

In one or more exemplary embodiments, the vertical take-off and landing aircraft may further include a first lever, a second lever, a third lever, and a fourth lever. In an exemplary embodiment, the first lever may be configured to control the first stepper motor and the first tilt angle of the first propeller.

In an exemplary embodiment, the second lever may be configured to control the second stepper motor and the second tilt angle of the second propeller. In an exemplary embodiment, the third lever may be configured to control the third stepper motor and the third tilt angle of the third propeller. In an exemplary embodiment, the fourth lever may be configured to control the fourth stepper motor and the fourth tilt angle of the fourth propeller.

In one or more exemplary embodiments, the first tilt angle of the first propeller, the second tilt angle of the second propeller, the third tilt angle of the third propeller, and the fourth tilt angle of the fourth propeller may be controlled to perform take-off, ascent, cruise, descent, hovering movements, and landing of the vertical take-off and landing airplane.

In one or more exemplary embodiments, during take-off, hovering, and landing of the vertical take-off and landing aircraft, the first tilt angle of the first propeller may be controlled to be at 0 degrees associated with the first propeller being in a horizontal position, the second tilt angle of the second propeller may be controlled to be at 0 degrees associated with the second propeller being in the horizontal position, the third tilt angle of the third propeller may be controlled to be at 0 degrees associated with the third propeller being in the horizontal position, and the fourth tilt angle of the fourth propeller may be controlled to be at 0 degrees associated with the fourth propeller being in the horizontal position.

In one or more exemplary embodiments, during cruise of the vertical take-off and landing aircraft, the first tilt angle of the first propeller may be controlled to be at 90 degrees associated with the first propeller being in a vertical position, the second tilt angle of the second propeller may be controlled to be at 90 degrees associated with the second propeller being in the vertical position, the third tilt angle of the third propeller may be controlled to be at 90 degrees associated with the third propeller being in the vertical position, and the fourth tilt angle of the fourth propeller may be controlled to be at 90 degrees associated with the fourth propeller being in the vertical position.

In one or more exemplary embodiments, a thrust of the vertical take-off and landing aircraft may be controlled by controlling a first blase pitch angle associated with first blades of the first propeller, a second blade pitch angle associated with second blades of the second propeller, a third blade pitch angle associated with third blades of the third propeller, and a fourth blade pitch angle associated with fourth blades of the fourth propeller.

In one or more exemplary embodiments, during cruise of the vertical take-off and landing aircraft, the first blade pitch angle may be controlled to be at a first angle, the second blade pitch angle may be controlled to be at the first angle, the third blade pitch angle may be controlled to be at the first angle, and the fourth blade pitch angle may be controlled to be at the first angle.

In one or more exemplary embodiments, during take-off of the vertical take-off and landing aircraft, the first blade pitch angle may be controlled to be at a second angle, the second blade pitch angle may be controlled to be at the second angle, the third blade pitch angle may be controlled to be at the second angle, and the fourth blade pitch angle may be controlled to be at the second angle. In an exemplary embodiment, the first angle may be higher than the second angle.

In an exemplary embodiment, the first blade pitch angle may be controlled by controlling a ninth gearbox connected to the first propeller. In an exemplary embodiment, the second blade pitch angle may be controlled by controlling a tenth gearbox connected to the second propeller. In an exemplary embodiment, the third blade pitch angle may be controlled by controlling an eleventh gearbox connected to the third propeller. In an exemplary embodiment, the fourth blade pitch angle may be controlled by controlling a twelfth gearbox connected to the fourth propeller.

In one or more exemplary embodiments, responsive to failure of the second engine, the first tilt angle of the first propeller may be controlled to be at 0 degrees associated with the first propeller being in a horizontal position, the second tilt angle of the second propeller may be controlled to be at 0 degrees associated with the second propeller being in a horizontal position, the third tilt angle of the third propeller may be controlled to be at 0 degrees associated with the third propeller being in a horizontal position, the fourth tilt angle of the fourth propeller may be controlled to be at 0 degrees associated with the fourth propeller being in a horizontal position.

Furthermore, in an exemplary embodiment, responsive to failure of the second engine, the first engine may be used to run the third propeller and the fourth propeller using a first clutch, a second clutch, and an inverter. In an exemplary embodiment, the first clutch may be connected to the first taper tube assembly. In an exemplary embodiment, the second clutch may be connected to the second taper tube assembly. In an exemplary embodiment, the inverter may be connected to the first clutch and the second clutch via one or more shafts within one or more conduits.

In an exemplary embodiment, blades of the first propeller may rotate in a first direction. In an exemplary embodiment, blades of the second propeller may also rotate in the first direction. In an exemplary embodiment, blades of the third propeller may rotate in a second direction. In an exemplary embodiment, blades of the fourth propeller may also rotate in the second direction. In an exemplary embodiment, the second direction may be opposite to the first direction.

In one or more exemplary embodiments, during heading direction change of the vertical and take-off landing aircraft to the left, the second engine thrust setting may be controlled to decrease, the first engine thrust setting may be controlled to increase, and the first engine exhaust duct nozzle may be controlled to be at 90 degrees.

According to an exemplary embodiment, the present disclosure also describes a vertical take-off and landing aircraft. In an exemplary embodiment, the vertical take-off and landing aircraft may include a single wing, a plurality of engines, a first set of propellers, a second set of propellers, a first power transfer unit, and a second power transfer unit.

In an exemplary embodiment, the plurality of engines may include a first engine mounted to a first side of the single wing. In an exemplary embodiment, the plurality of engines may further include a second engine mounted to a second side of the single wing.

In an exemplary embodiment, the first set of propellers may be provided on the first side of the single wing. In an exemplary embodiment, the second set of propellers may be provided on the second side of the single wing.

In one or more exemplary embodiments, the first power transfer unit may include a first taper tube assembly, and a second taper tube assembly. In an exemplary embodiment, the first taper tube assembly may be connected to a first propeller of the first set of propellers and a first power shaft of the first engine. In an exemplary embodiment, the second taper tube assembly may be connected to a second propeller of the first set of propellers and a first shaft assembly connected to the first power shaft.

In an exemplary embodiment, the second power transfer unit may include a third taper tube assembly and a fourth taper tube assembly. In an exemplary embodiment, the third taper tube assembly may be connected to a third propeller of the second set of propellers and a second power shaft of the second engine. In an exemplary embodiment, the fourth taper tube assembly may be connected to a fourth propeller of the second set of propellers and a second shaft assembly connected to the second power shaft.

According to an exemplary embodiment, the present disclosure also describes a vertical take-off and landing aircraft. In an exemplary embodiment, the vertical take-off and landing aircraft may include a single wing, a first turboshaft engine, a second turboshaft engine, a first propeller, a second propeller, a third propeller, a fourth propeller, a first power transfer unit, a second power transfer unit, a landing gear, and a fuselage.

In an exemplary embodiment, the single wing may be made of spars, ribs, and sheet metal. In an exemplary embodiment, the first turboshaft engine may be mounted to a first side of the single wing. In an exemplary embodiment, the second turboshaft engine may be mounted to a second side of the single wing. In an exemplary embodiment, the first propeller may be provided on the first side of the single wing.

In an exemplary embodiment, the second propeller may be provided on the first side of the single wing. In an exemplary embodiment, the third propeller may be provided on the second side of the single wing. In an exemplary embodiment, the fourth propeller may be provided on the second side of the single wing.

In one or more exemplary embodiments, the first power transfer unit may include a first taper tube assembly and a second taper tube assembly. In an exemplary embodiment, the first taper tube assembly may be connected to the first propeller and a first power shaft of the first turboshaft engine. In an exemplary embodiment, the second taper tube assembly may be connected to the second propeller and a first shaft assembly connected to the first power shaft.

In one or more exemplary embodiments, the second power transfer unit may include a third taper tube assembly and a fourth taper tube assembly. In an exemplary embodiment, the third taper tube assembly may be connected to the third propeller and a second power shaft of the first turboshaft engine. In an exemplary embodiment, the fourth taper tube assembly may be connected to the fourth propeller and a second shaft assembly connected to the first power shaft.

In an exemplary embodiment, the landing gear may be connected to the single wing. In an exemplary embodiment, the fuselage may be connected to the single wing. In an exemplary embodiment, the fuselage may include an auxiliary power unit (APU). In an exemplary embodiment, the auxiliary power unit may be configured to provide electrical and pneumatic energy to the vertical take-off and landing aircraft.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Disclosed herein a vertical take-off and landing (VTOL) aircraft with the ability to hold and carry up to 100 passengers. Typical vertical take-off and landing (VTOL) aircrafts may be associated with some issues such as infeasibility and high flight cost. Because of the simple design and simple structure of the disclosed vertical take-off and landing (VTOL) aircraft, it may be easy to build and develop. In other words, it is feasible to build and develop the disclosed vertical take-off and landing (VTOL) aircraft. The simple structure of vertical take-off and landing (VTOL) aircraft may also reduce flight cost for this aircraft relative to typical ones.

Furthermore, typical vertical take-off and landing (VTOL) aircrafts, generally, are equipped with two separated wings. These separated wings may impose excess and unwanted vibration to an aircraft and, specifically, to a fuselage of the aircraft. The disclosed vertical take-off and landing (VTOL) aircraft may include a single integrated wing rather than two separated wings. Benefits from utilizing a single integrated wing may include, but not limited to, a reduction in fuselage vibrations.

Figure 1:
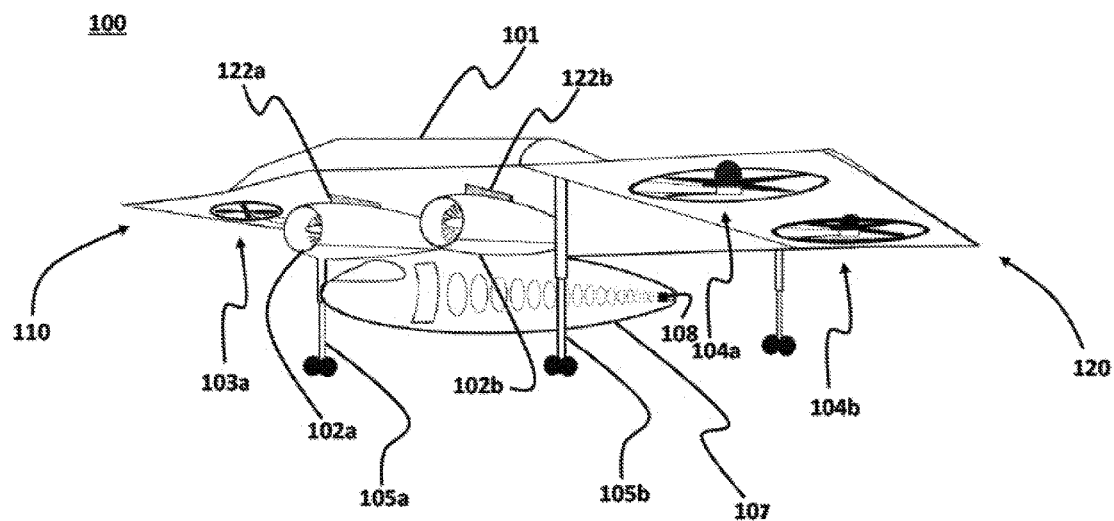
FIG. 1 illustrates a perspective view of an exemplary vertical take-off and landing aircraft (VTOL), consistent with one or more exemplary embodiments of the present disclosure.

FIG. 1 shows a perspective view of an exemplary vertical take-off and landing aircraft 100, consistent with one or more exemplary embodiments of the present disclosure. As shown in FIG. 1, in an exemplary embodiment, vertical take-off and landing aircraft 100 may include a single wing 101, a plurality of engines, a first set of propellers on a first side 110 of single wing 101, a second set of propellers on a second side 120 of single wing 101, a plurality of landing gears, and a fuselage 106 connected to single wing 101.

Figure 2:
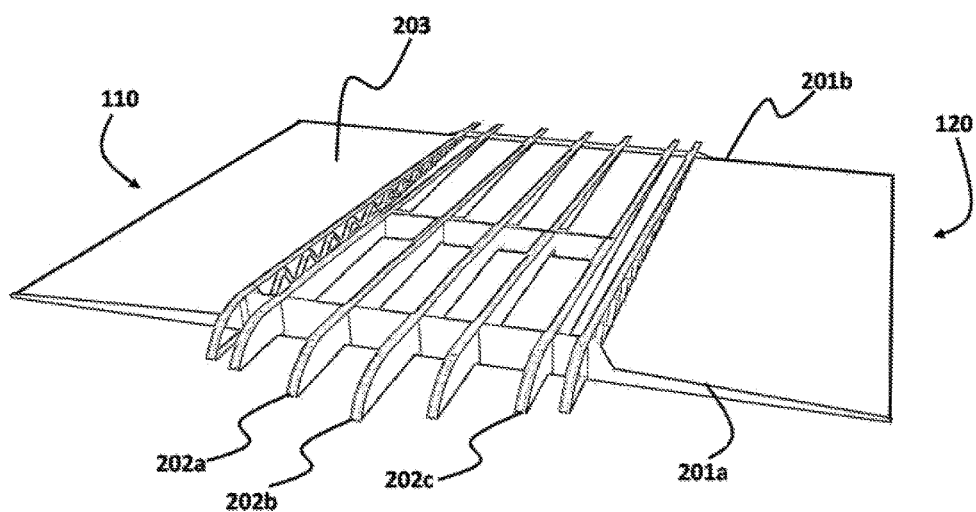
FIG. 2 illustrates a perspective view of a single wing of an exemplary vertical take-off and landing aircraft, consistent with one or more exemplary embodiments of the present disclosure.
Figure 3:
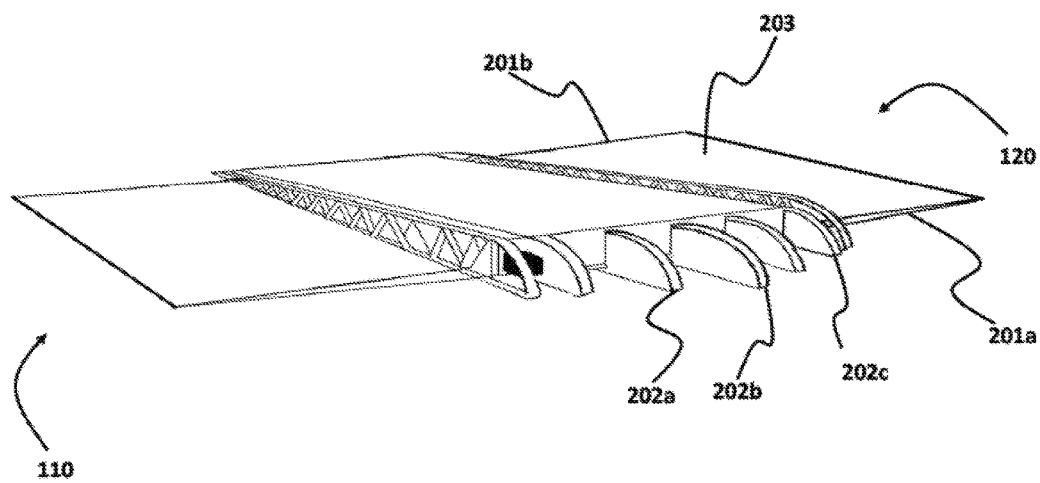
FIG. 3 illustrates another perspective view of a single wing of an exemplary vertical take-off and landing aircraft, consistent with one or more exemplary embodiments of the present disclosure.

FIG. 2 illustrates a perspective view of a single wing of an exemplary vertical take-off and landing aircraft, consistent with one or more exemplary embodiments of the present disclosure. FIG. 3 illustrates another perspective view of a single wing of an exemplary vertical take-off and landing aircraft, consistent with one or more exemplary embodiments of the present disclosure. As shown in FIG. 2 and FIG. 3, in an exemplary embodiment, single wing 101 may be made of a plurality of spars 201, a plurality of ribs 202, and a sheet metal 203. In an exemplary embodiment, plurality of spars 201 may include a first spar 201a and a second spar 201b. For purpose of reference, it may be understood that, in an exemplary embodiment, the term "spar" may refer to a structural member of single wing 101, running spanwise at right angles to fuselage 106. It also may be understood that, in an exemplary embodiment, plurality of spars 201 may be configured to carry flight loads and the weight of single wing 101 while vertical take-off and landing aircraft 100 is on the ground. In an exemplary embodiment, it may be understood that first spar 201a may refer to a front spar of single wing 101 and second spar 201b may refer to an aft spar of single wing 101.

With the further reference to FIG. 2 and FIG. 3, in an exemplary embodiment, plurality of ribs 202 may include a first rib 202a, a second rib 202b, and a third rib 202c. For purpose of reference, it may be understood that, in an exemplary embodiment, the term "ribs" may refer to some forming elements of a structure of single wing 101. Ribs may attach to plurality of spars 201, and may be repeated at frequent intervals along plurality of spars 201 to form a skeletal shape for single wing 101.

As shown in FIG. 1, in an exemplary embodiment, the plurality of engines may include a first engine 102a and a second engine 102b. In an exemplary embodiment, first engine 102a may be mounted to first side 110 of single wing 101 and second engine 102b may be mounted to second side 120 of single wing 101. It may be understood that, in an exemplary embodiment, first side 110 may refer to a right side of single wing 101 and second side 120 may refer to a left side of single wing 101. In an exemplary embodiment, each of first engine 102a and second engine 102b may include a respective engine exhaust duct nozzle equipped with a rotation mechanism that provides a facility for the respective engine exhaust duct nozzle that allows it to rotate in a range between 0 and 90 degrees. Benefits from utilizing the engine exhaust duct nozzle may include, but not limited, to an improvement in vertical take-off and landing aircraft 100 vertical thrust.

As shown in FIG. 1, in an exemplary embodiment, the first set of propellers may include a first propeller 103a and a second propeller 103b (obscured from view in FIG. 1). In an exemplary embodiment, the second set of propellers may include a third propeller 104a and a fourth propeller 104b. In an exemplary embodiments, the plurality of landing gears may include a first landing gear 105a connected to first side 110 of single wing 101. In an exemplary embodiments, the plurality of landing gears may further include a second landing gear 105b connected to second side 120 of single wing 101. In an exemplary embodiment, fuselage 106 may be configured to hold and carry up to 100 passengers. Furthermore, in an exemplary embodiment, fuselage 106 may include an auxiliary power unit (APU) 108 configured to provide electrical and pneumatic energy to vertical take-off and landing aircraft 100.

Figure 4A:
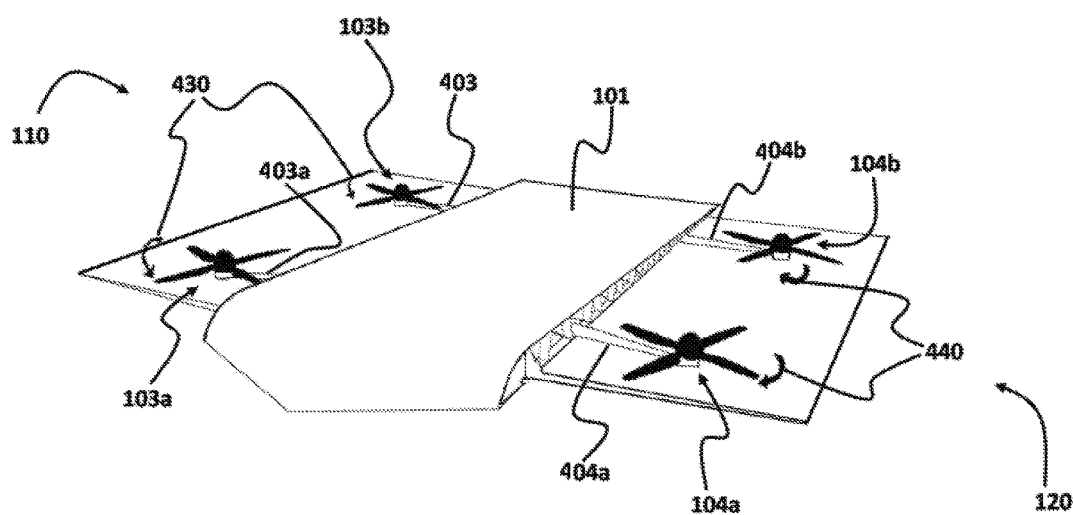
FIG. 4A illustrates a single wing of an exemplary vertical take-off and landing aircraft with four associated propellers, consistent with one or more exemplary embodiments of the present disclosure.
Figure 4B:
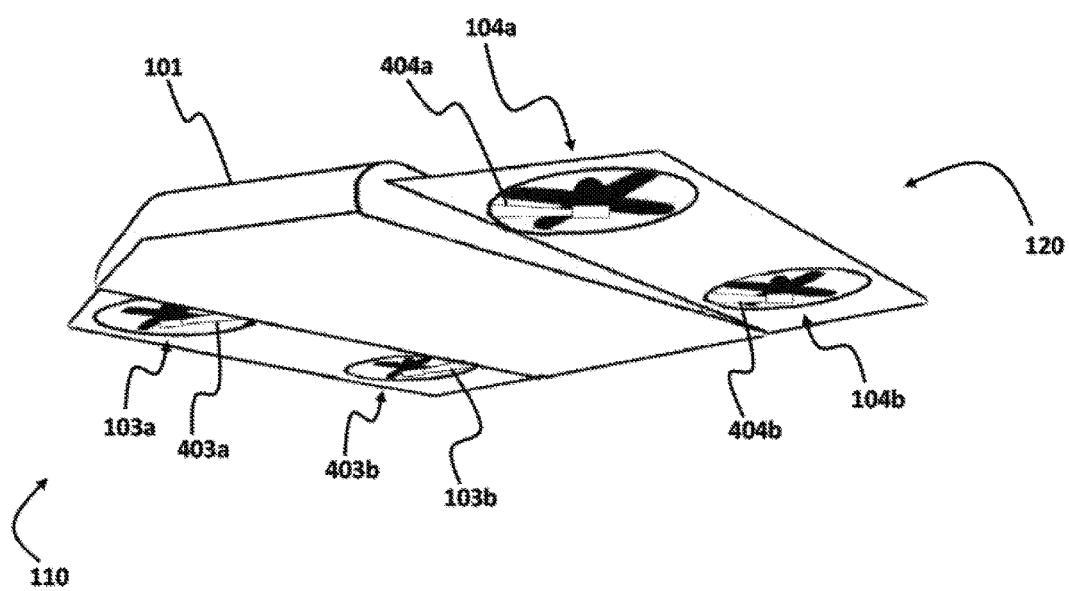
FIG. 4B illustrates a perspective view of an exemplary wing assembly utilized in a vertical take-off and landing aircraft, consistent with one or more exemplary embodiments of the present disclosure.

In an exemplary embodiment, vertical take-off and landing aircraft 100 may include a first power transfer unit associated with the first set of propellers and first engine 102a. In an exemplary embodiment, vertical take-off and landing aircraft 100 may further include a second power transfer unit associated with the second set of propellers and second engine 102b. FIG. 4A shows a single wing of an exemplary vertical take-off and landing aircraft with four associated propellers, consistent with one or more exemplary embodiments of the present disclosure. FIG. 4B shows a perspective view of an exemplary wing assembly utilized in a vertical take-off and landing aircraft, consistent with one or more exemplary embodiments of the present disclosure.

As shown in FIG. 4, in an exemplary embodiment, the first power transfer unit may include a first taper tube assembly 403a and a second taper tube assembly 403b. In an exemplary embodiment, first taper tube assembly 403a may be connected to first propeller 103a of the first set of propellers. In an exemplary embodiment, first taper tube assembly 403a may also be connected to first engine 102a. In an exemplary embodiment, first taper tube assembly 403a may be connected to first engine 102a through a first power shaft of first engine 102a. In an exemplary embodiment, second taper tube assembly 403b may be connected to second propeller 103b of the first set of propellers. In an exemplary embodiment, second taper tube assembly 403b may also be connected to first engine 102a. In an exemplary embodiment, second taper tube assembly may be connected to first engine 102a through the first power shaft of first engine 102a. In an exemplary embodiment, second taper tube assembly may be connected to the first power shaft of first engine 102a through a first shaft assembly. In an exemplary embodiment, first engine 102a may be configured to run first propeller 103a of the first set of propellers and second propeller 103b of the first set of propellers.

As shown in FIG. 4, in an exemplary embodiment, the second power transfer unit may include a third taper tube assembly 404a and a fourth taper tube assembly 404b. In an exemplary embodiment, third taper tube assembly 404a may be connected to third propeller 104a of the second set of propellers 104. In an exemplary embodiment, third taper tube assembly 404a may also be connected to second engine 102b. In an exemplary embodiment, third taper tube assembly 404a may be connected to second engine 102b through a second power shaft of second engine 102b. In an exemplary embodiment, fourth taper tube assembly 404b may be connected to fourth propeller 104b of the second set of propellers 104. In an exemplary embodiment, fourth taper tube assembly 404b may also be connected to second engine 102b. In an exemplary embodiment, fourth taper tube assembly may be connected to second engine 102b through the second power shaft of second engine 102b. In an exemplary embodiment, fourth taper tube assembly may be connected to the second power shaft of second engine 102b through a second shaft assembly. In an exemplary embodiment, second engine 102b may be configured to run third propeller 104a of the second set of propellers and fourth propeller 104b of the second set of propellers.

With the further reference to FIG. 1, in an exemplary embodiment, first engine 102a may be mounted to first side 110 of single wing 101. In an exemplary embodiment, first engine 102a may be mounted to first side 110 of single wing 101 via a first pylon 122a. In an exemplary embodiment, first pylon 122a may include a first shock damper system (not shown in FIG. 1). In an exemplary embodiment, first pylon 122a may be configured to suppress vibrations of first engine 102a on single wing 101. In an exemplary embodiment, first engine 102a from the plurality of engines may include a first turbo shaft engine.

In an exemplary embodiment, second engine 102b may be mounted to second side 110 of single wing 101. In an exemplary embodiment, first engine 102a may be mounted to first side 120 of single wing 101 via a second pylon 122b. In an exemplary embodiment, second pylon 122b may include a second shock damper system (not shown in FIG. 1). In an exemplary embodiment, second pylon 122b may be configured to suppress vibrations of second engine 102b on single wing 101. In an exemplary embodiment, second engine 102b from the plurality of engines may include a second turbo shaft engine In an exemplary embodiment, fuselage 106 may be connected to single wing 101 via a third pylon (obscured from view in FIG. 1). In an exemplary embodiment, the third pylon may include a third shock damper system. In an exemplary embodiment, the third pylon may be configured to suppress vibrations of single wing 101 on fuselage 106.

Figure 5:
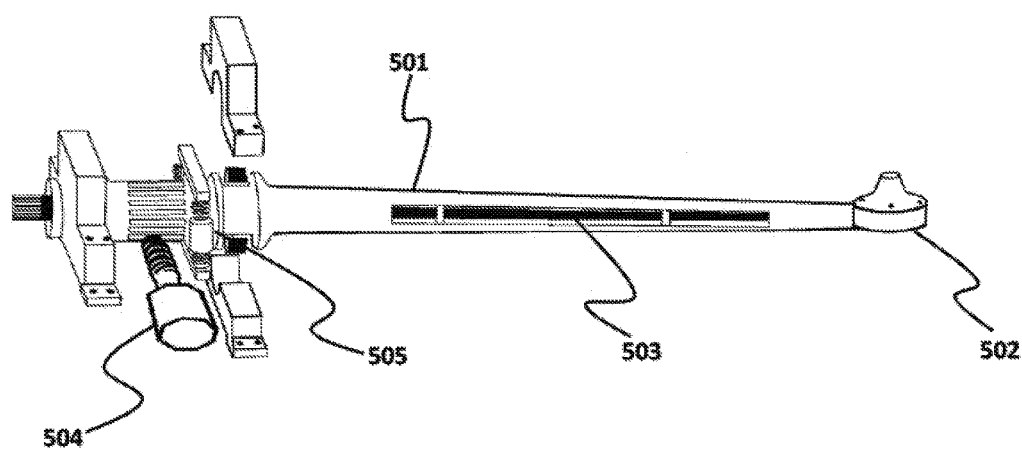
FIG. 5 illustrates a perspective view of an exemplary taper tube assembly utilized in a vertical take-off and landing aircraft, consistent with one or more exemplary embodiments of the present disclosure.
Figure 6:
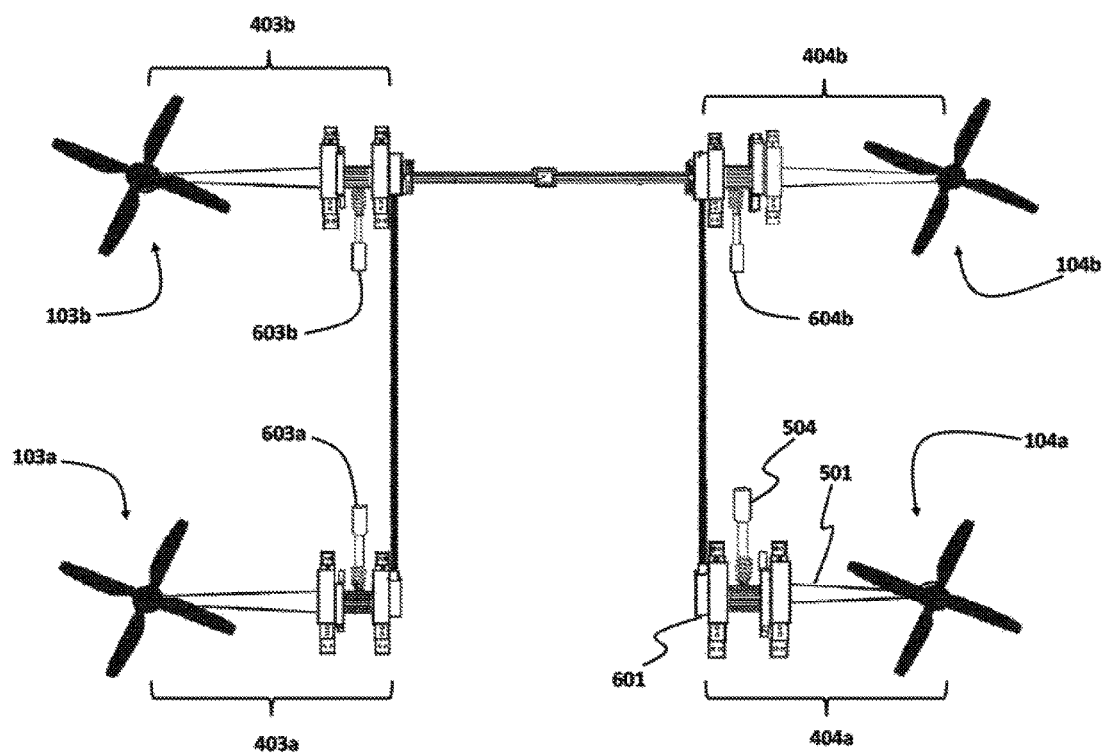
FIG. 6 illustrates a top view of an exemplary gear boxes arrangement utilized in a vertical take-off and landing aircraft for running the vertical take-off and landing aircraft's propellers, consistent with one or more exemplary embodiments of the present disclosure.

FIG. 5 shows a perspective view of an exemplar) taper tube assembly utilized in a vertical take-off and landing aircraft, consistent with one or more exemplary embodiments of the present disclosure. FIG. 6 shows a top view of an exemplary gear boxes arrangement utilized in a vertical take-off and landing aircraft for running the vertical take-off and landing aircraft's propellers, consistent with one or more exemplary embodiments of the present disclosure.

For purpose of reference, it may be understood that taper tube assembly shown in FIG. 5 may be substantially similar to each of first taper tube assembly 403a, second taper tube assembly 403b, third taper tube assembly 404a, and fourth taper tube assembly 404b. For example, the exemplary taper tube assembly shown in FIG. 5 may refer to third taper tube assembly 404a.

As shown in FIG. 5, in an exemplary embodiment, third taper tube assembly 404a may include a third taper tube 501, a fifth gearbox 601 (not shown in FIG. 5), a sixth gearbox 502, a third inner shaft 503 provided within third taper tube 501, a third stepper motor 504, and one or more third brakes 505. In an exemplary embodiment, the fifth gearbox may be connected to the second power shaft of second engine 102b and third inner shaft 503. In an exemplary embodiment, fifth gearbox may be configured to transfer power from second engine 102b to third inner shaft 503. In an exemplary embodiment, sixth gearbox 502 may be connected to third inner shaft 503 and third propeller 104a. In an exemplary embodiment, sixth gearbox 502 may be configured to transfer power from third inner shaft 503 to third propeller 104a. For purpose of reference, it could be understood that the fifth gearbox, sixth gearbox 502, and third inner shaft 503 may be configured to transfer power from the second power shaft of second engine 102b to third propeller 104a. In an exemplary embodiment, third inner shaft 503 may be configured to have a roll movement in a range between −20 degrees and +120 degrees.

In an exemplary embodiment, third stepper motor 504 may be configured to control a third tilt angle of third propeller 104a by controlling a third angular position of third taper tube. In an exemplary embodiment, one or more third brakes 505 may be configured to secure the third angular position of third taper tube 501.

In an exemplary embodiment, first taper tube assembly 403a may include a first taper tube, a first gearbox, a second gearbox, a first inner shaft provided within the first taper tube, a first stepper motor 603, and one or more first brakes. In an exemplary embodiment, second taper tube assembly 403b may include a second taper tube, a third gearbox, a fourth gearbox, a second inner shaft provided within the second taper tube, a second stepper motor 603b, and one or more second brakes. In an exemplary embodiment, fourth taper tube assembly 404b may include a fourth taper tube, a seventh gearbox, an eighth gearbox, a fourth inner shaft provided within the fourth taper tube, a fourth stepper motor 604b, and one or more fourth brakes.

Figure 7:
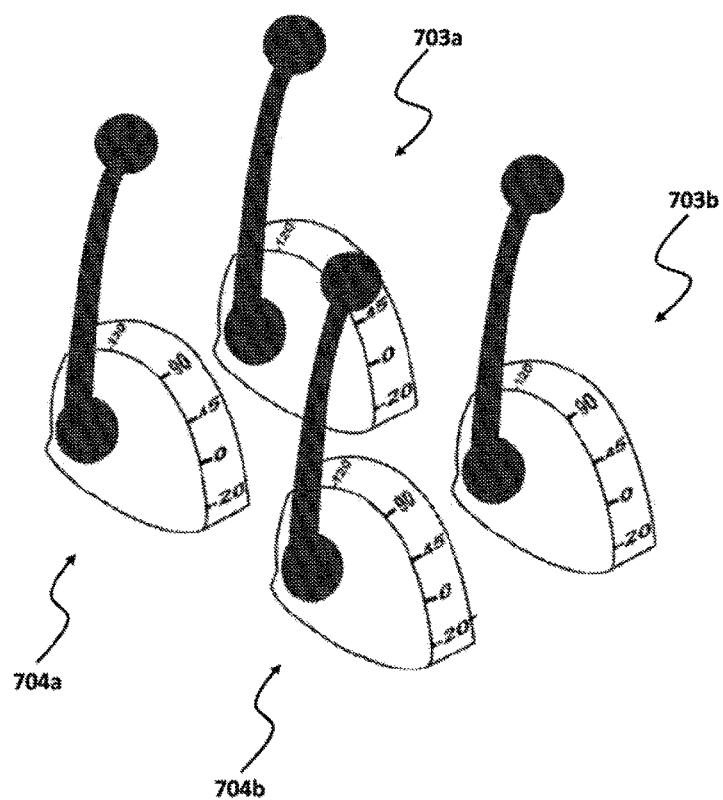
FIG. 7 illustrates four levers utilized in a vertical take-off and landing aircraft, consistent with one or more exemplary embodiments of the present disclosure.

FIG. 7 shows four levers utilized in a vertical take-off and landing aircraft, consistent with one or more exemplary embodiments of the present disclosure. As shown in FIG. 7, in an exemplary embodiment, vertical take-off and landing aircraft 100 may include a first lever 703a associated with first propeller 103a, a second lever 703b associated with second propeller 103b, a third lever 704a associated with third propeller 104a, and a fourth lever 704b associated with fourth propeller 104b. In an exemplary embodiment, first lever 703a may be configured to control first stepper motor 603a and a first tilt angle of first propeller 103a. In an exemplary embodiment, second lever 703b may be configured to control second stepper motor 603b and a first tilt angle of first propeller 103b. In an exemplary embodiment, third lever 704a may be configured to control third stepper motor 504 and the third tilt angle of third propeller 104a. In an exemplary embodiment, fourth lever 704b may be configured to control fourth stepper motor 604b and a fourth tilt angle of fourth propeller 104b.

For purpose of reference, it may be understood that in an exemplary embodiment, the first tilt angle of first propeller 103a, the second tilt angle of second propeller 103b, the third tilt angle of third propeller 104a, and the fourth tilt angle of fourth propeller 104b may be controlled respectively by first lever 703a, second lever 703b, third lever 704a, and fourth lever 704b to perform a take-off movement, an ascent movement, a cruise movement, a descent movement, a hovering movement, and a landing movement of vertical take-off and landing aircraft 100.

Figure 8A:
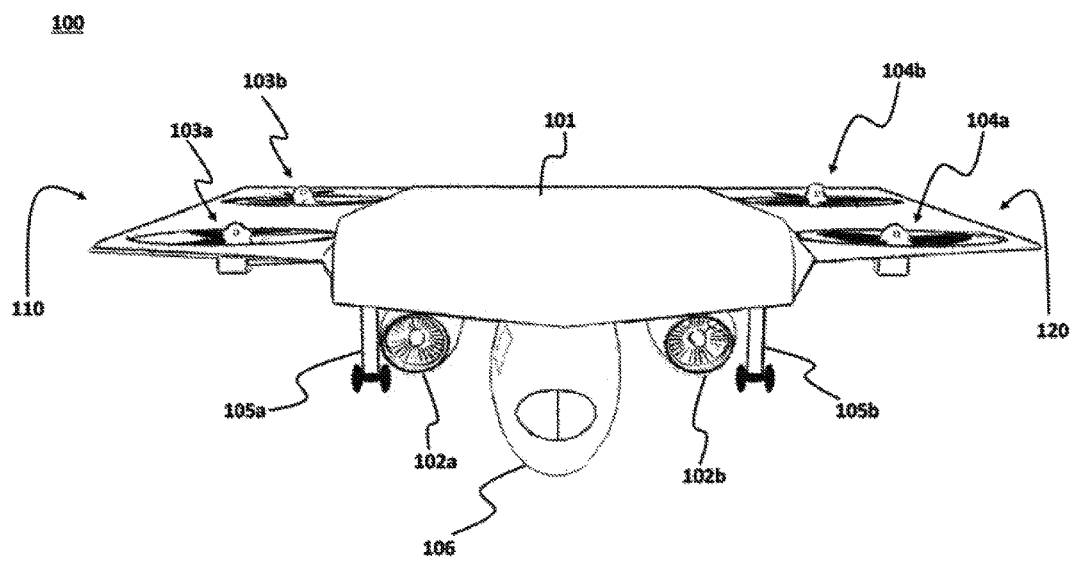
FIG. 8A illustrates an exemplary vertical take-off and landing aircraft during a hovering movement, a take-off movement, or a landing movement of the vertical take-off and landing aircraft, consistent with one or more exemplary embodiments of the present disclosure.
Figure 8:
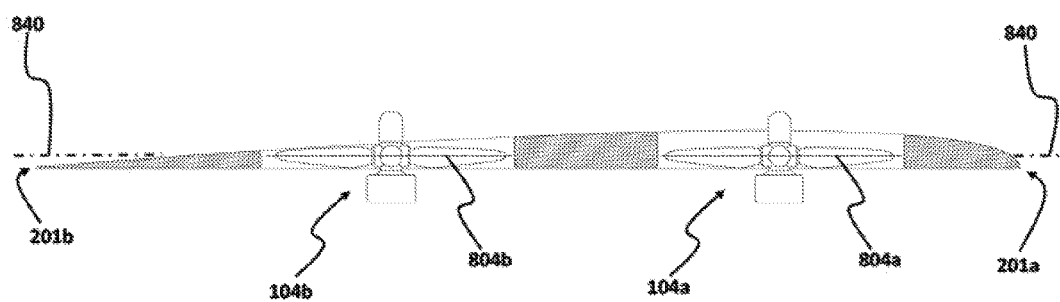
FIG. 8B illustrates a left view of a second set of propellers of an exemplary vertical take-off and landing aircraft during a hovering movement, a take-off movement, or a landing movement of the vertical take-off and landing aircraft, consistent with one or more exemplary embodiments of the present disclosure.
FIG. 8C illustrates a left view of a first set of propellers of an exemplary vertical take-off and landing aircraft during a hovering movement, a take-off movement, or a landing movement of the vertical take-off and landing aircraft, consistent with one or more exemplary embodiments of the present disclosure.
Figure 8:
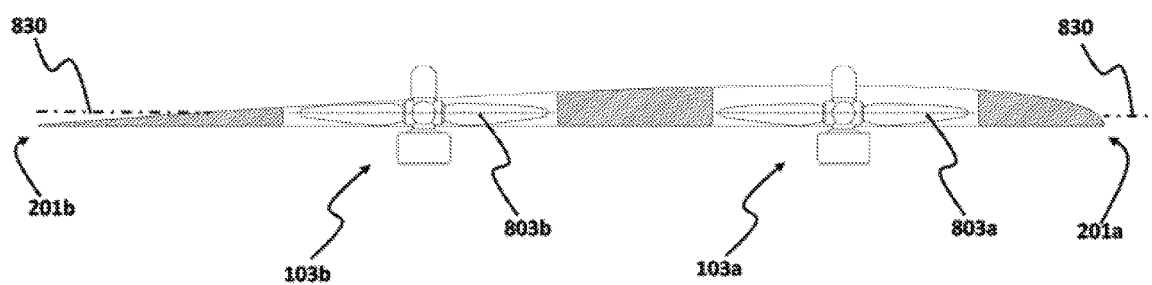

FIG. 8A shows an exemplary vertical take-off and landing aircraft during a hovering movement, a take-off movement, or a landing movement of the vertical take-off and landing aircraft, consistent with one or more exemplary embodiments of the present disclosure. FIG. 8B shows a left view of a second set of propellers of an exemplary vertical take-off and landing aircraft during a hovering movement, a take-off movement, or a landing movement of the vertical take-off and landing aircraft, consistent with one or more exemplary embodiments of the present disclosure. FIG. 8C shows a left view of a first set of propellers of an exemplary vertical take-off and landing aircraft during a hovering movement, a take-off movement, or a landing movement of the vertical take-off and landing aircraft, consistent with one or more exemplary embodiments of the present disclosure.

As shown in FIG. 8A, FIG. 8B, and FIG. 8C, in an exemplary embodiment, during a hovering movement, a take-off movement, or a landing movement of vertical take-off and landing aircraft 100, the first tilt angle of first propeller 103a may be controlled by first lever 703a to be at 0 degrees associated with first propeller 103a being in a horizontal position. For purpose of reference, it may be understood that the first tilt angle of first propeller 103a may refer to an angle between a first main axis 803a of first propeller 103a and a first main horizontal axis 830 of single wing 101.

In an exemplary embodiment, during the hovering movement, the take-off movement, or the landing movement of vertical take-off and landing aircraft 100, the second tilt angle of second propeller 103b may be controlled by second lever 703b to be at 0 degrees associated with second propeller 103b being in the horizontal position. For purpose of reference, it may be understood that the second tilt angle of second propeller 103b may refer to an angle between a second main axis 803b of second propeller 103b and first main horizontal axis 830 of single wing 101.

In an exemplary embodiment, during the hovering movement, the take-off movement, or the landing movement of vertical take-off and landing aircraft 100, the third tilt angle of third propeller 104a may be controlled to be at 0 degrees associated with third propeller 104a being in the horizontal position. For purpose of reference, it may be understood that the third tilt angle of third propeller 104a may refer to an angle between a third main axis 804a of third propeller 104a and a second main horizontal axis 840 of single wing 101.

In an exemplary embodiment, during the hovering movement, the take-off movement, or the landing movement of vertical take-off and landing aircraft 100, the fourth tilt angle of fourth propeller 104b may be controlled to be at 0 degrees associated with fourth propeller 104b being in the horizontal position. For purpose of reference, it may be understood that the fourth tilt angle of fourth propeller 104b may refer to an angle between a fourth main axis 804b of fourth propeller 104b and second main horizontal axis 840 of single wing 101.

In an exemplary embodiment, during the hovering movement, the take-off movement, or the landing movement of vertical take-off and landing aircraft 100, first engine 102a exhaust duct nozzle and second engine 102b exhaust duct nozzle may be controlled to be at 90 degrees.

Figure 9A:
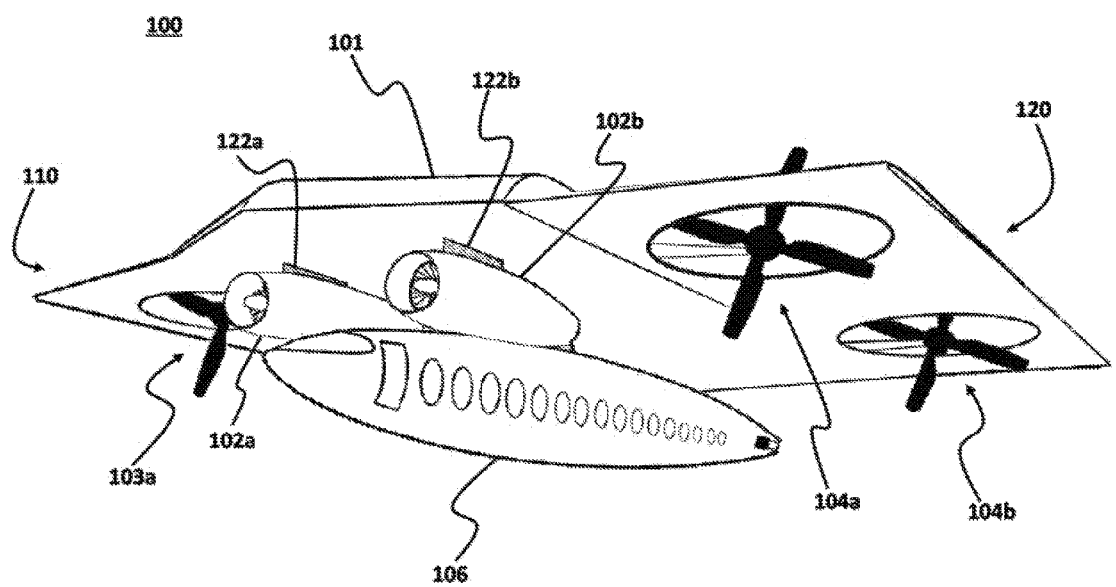
FIG. 9A illustrates an exemplary vertical take-off and landing aircraft during a cruise movement, consistent with one or more exemplary embodiments of the present disclosure.
Figure 9B:
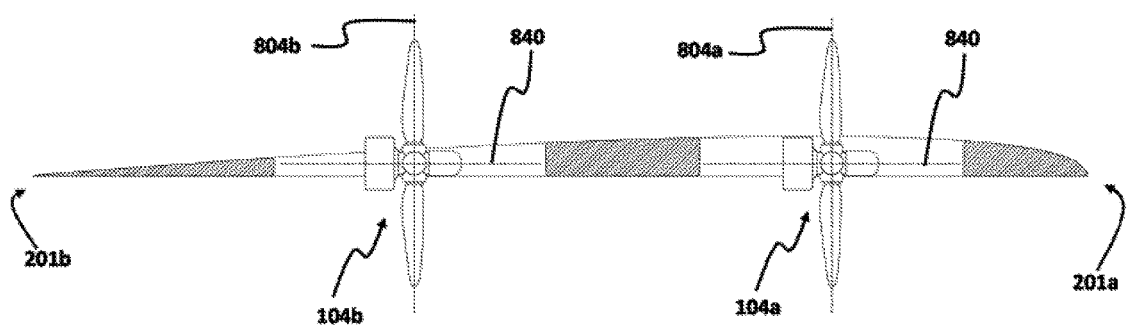
FIG. 9B illustrates a left view of a second set of propellers of an exemplary vertical take-off and landing aircraft during a cruise movement, consistent with one or more exemplary embodiments of the present disclosure.
Figure 9C:
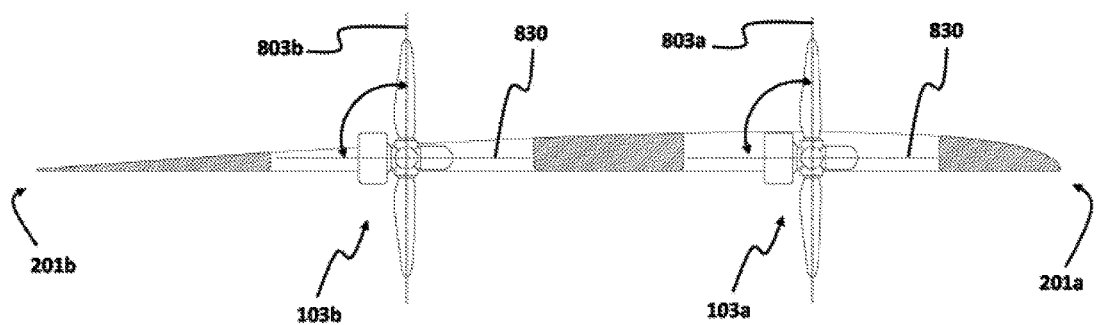
FIG. 9C illustrates a left view of a first set of propellers of an exemplary vertical take-off and landing aircraft during a cruise movement, consistent with one or more exemplary embodiments of the present disclosure.

FIG. 9A shows an exemplary vertical take-off and landing aircraft during a cruise movement, consistent with one or more exemplary embodiments of the present disclosure. FIG. 9B shows a left view of a second set of propellers of an exemplary vertical take-off and landing aircraft during a cruise movement, consistent with one or more exemplary embodiments of the present disclosure. FIG. 9C shows a left view of a first set of propellers of an exemplary vertical take-off and landing aircraft during a cruise movement, consistent with one or more exemplary embodiments of the present disclosure. As shown in FIG. 9A, FIG. 9B, and FIG. 9C, in an exemplary embodiment, during a cruise movement of vertical take-off and landing aircraft 100, the first tilt angle of first propeller 103a may be controlled to be at 90 degrees associated with first propeller 103a being in a vertical position. For purpose of reference, it may be understood that the first tilt angle of first propeller 103a may refer to an angle between a first main axis 803a of first propeller 103a and a first main horizontal axis 830 of single wing 101.

In an exemplary embodiment, during the cruise movement of vertical take-off and landing aircraft 100, the second tilt angle of second propeller 103b may be controlled to be at 90 degrees associated with second propeller 103b being in the vertical position. For purpose of reference, it may be understood that the second tilt angle of second propeller 103b may refer to an angle between a second main axis 803b of second propeller 103b and first main horizontal axis 830 of single wing 101.

In an exemplary embodiment, during the cruise movement of vertical take-off and landing aircraft 100, the third tilt angle of third propeller 104a may be controlled to be at 90 degrees associated with third propeller 104a being in the vertical position. For purpose of reference, it may be understood that the third tilt angle of third propeller 104a may refer to an angle between a third main axis 804a of third propeller 104a and a second main horizontal axis 840 of single wing 101.

In an exemplary embodiment, during the cruise movement of vertical take-off and landing aircraft 100, the fourth tilt angle of fourth propeller 104b may be controlled to be at 90 degrees associated with fourth propeller 104b being in the vertical position. For purpose of reference, it may be understood that the fourth tilt angle of fourth propeller 104b may refer to an angle between a fourth main axis 804b of fourth propeller 104b and second main horizontal axis 840 of single wing 101.

In an exemplary embodiment, a thrust of vertical take-off and landing aircraft 100 may be controlled by controlling a first blade pitch angle, a second blade pitch angle, a third blade pitch angle, and a fourth blade pitch angle. In an exemplary embodiment, the first blade pitch angle may be associated with first blades of first propeller 103a. In an exemplary embodiment, the second blade pitch angle may be associated with second blades of second propeller 103b. In an exemplary embodiment, the third blade pitch angle may be associated with third blades of third propeller 104a. In an exemplary embodiment, the fourth blade pitch angle may be associated with fourth blades of fourth propeller 104b.

In an exemplary embodiment, it may be understood that the first blade pitch angle may refer to an angle between a main plane of each of first blades of first propeller 103a and first main horizontal axis 830 of single wing 101. In an exemplary embodiment, it may be understood that the second blade pitch angle may refer to an angle between a main plane of each of second blades of second propeller 103b and first main horizontal axis 830 of single wing 101. In an exemplary embodiment, it may be understood that the third blade pitch angle may refer to an angle between a main plane of each of third blades of third propeller 104a and second horizontal axis 840 of single wing 101. In an exemplary embodiment, it may be understood that the fourth blade pitch angle may refer to an angle between a main plane of each of fourth blades of fourth propeller 104b and second horizontal axis 840 of single wing 101. It may be understood that the first blade pitch angle may refer to an attack angle of each of first blades of first propeller 103a.

In an exemplary embodiment, during the cruise movement of vertical take-off and landing aircraft 100, the first blade pitch angle, the second blade pitch angle, the third blade pitch angle, and the fourth blade pitch angle may be controlled to be at a first angle. In an exemplary embodiment, during the take-off movement of vertical take-off and landing aircraft 100, the first blade pitch angle, the second blade pitch angle, the third blade pitch angle, and the fourth blade pitch angle may be controlled to be at a second angle. In an exemplary embodiment, the first angle may be higher than the second angle.

In an exemplary embodiment, first taper tube assembly 403a may include a ninth gearbox connected to first propeller 103a. In an exemplary embodiment, the first blade pitch angle may be configured to be controlled by controlling the ninth gearbox. In an exemplary embodiment, second taper tube assembly 403b may include a tenth gearbox connected to second propeller 103b. In an exemplary embodiment, the second blade pitch angle may be configured to be controlled by controlling the tenth gearbox. In an exemplary embodiment, third taper tube assembly 404a may include an eleventh gearbox connected to third propeller 104a. In an exemplary embodiment, the third blade pitch angle may be configured to be controlled by controlling the eleventh gearbox. In an exemplary embodiment, fourth taper tube assembly 404b may include a twelfth gearbox connected to fourth propeller 104b. In an exemplary embodiment, the fourth blade pitch angle may be configured to be controlled by controlling the twelfth gearbox.

In an exemplary embodiment, when second engine 102b fails, the first tilt angle of first propeller 103a may be controlled to be at 0 degrees associated with first propeller 103a being in the horizontal position and the second tilt angle of second propeller 103b may be controlled to be at 0 degrees associated with second propeller 103b being in the horizontal position and the third tilt angle of third propeller 104a may be controlled to be at 0 degrees associated with third propeller 104a being in the horizontal position and the fourth tilt angle of fourth propeller 104b may be controlled to be at 0 degrees associated with fourth propeller 104b being in the horizontal position. Furthermore, in an exemplary embodiment, when second engine 102b fails, first engine 102a may be used to run third propeller 104a and fourth propeller 104b using a first clutch connected to first taper tube assembly 403a and a second clutch connected to second taper tube assembly 403b and a first inverter connected to the first clutch and the second clutch via one or more first shafts within one or more first conduits.

In an exemplary embodiment, when first engine 102a fails, the first tilt angle of first propeller 103a may be controlled to be at 0 degrees associated with first propeller 103a being in the horizontal position and the second tilt angle of second propeller 103b may be controlled to be at 0 degrees associated with second propeller 103b being in the horizontal position and the third tilt angle of third propeller 104a may be controlled to be at 0 degrees associated with third propeller 104a being in the horizontal position and the fourth tilt angle of fourth propeller 104b may be controlled to be at 0 degrees associated with fourth propeller 104b being in the horizontal position. Furthermore, in an exemplary embodiment, when first engine 102a fails, second engine 102b may be used to run first propeller 103a and second propeller 103b using a third clutch connected to third taper tube assembly 404a and a fourth clutch connected to fourth taper tube assembly 404b and a second inverter connected to the third clutch and the fourth clutch via one or more second shafts within one or more second conduits.

In an exemplary embodiment, one of first taper tube assembly 403a, second taper tube assembly 403b, third taper tube assembly 404a, and fourth taper tube assembly 404b may become stuck or jammed (also known as jamming). In this urgent case, vertical take-off and landing aircraft 100 may land without delay at a nearest suitable area. For example, in an exemplary embodiment, when first taper tube assembly 403a becomes stuck or jammed, the second tilt angle of second propeller 103b, the third tilt angle of third propeller 104a, and the fourth tilt angle of fourth propeller 104b may be controlled to be at 0 degrees. Furthermore, in an exemplary embodiment, first engine 102a exhaust duct nozzle may be controlled to be at 90 degrees.

In an exemplary embodiment, as shown in FIG. 4A, in an exemplary embodiment, the blades of first propeller 103a and the blades of second propeller 103b may be configured to rotate in a first direction 430. For purpose of reference, it may be understood that in an exemplary embodiment, first direction 430 may refer to a counterclockwise direction. With the further reference to FIG. 4A, in an exemplary embodiment, the blades of third propeller 104a and the blades of fourth propeller 104b may be configured to rotate in a second direction 440. For purpose of reference, it may be understood that in an exemplary embodiment, second direction 440 may refer to a clockwise direction.

Figure 10:
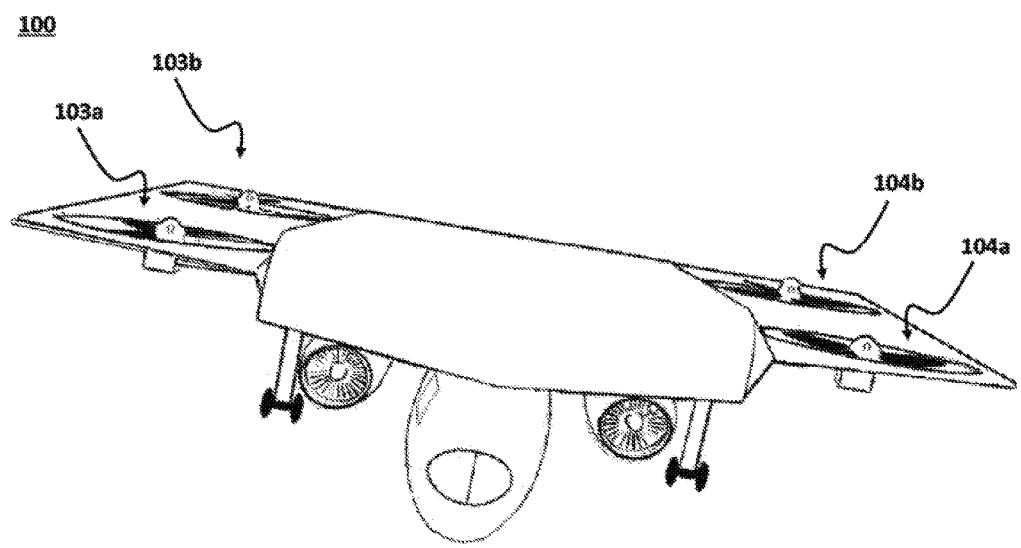
FIG. 10 illustrates an exemplary vertical take-off and landing aircraft during a heading direction change of the vertical take-off and landing aircraft to a left side of the vertical take-off and landing aircraft and during a hovering movement of the vertical take-off and landing aircraft, consistent with one or more exemplary embodiments of the present disclosure.

FIG. 10 shows an exemplary vertical take-off and landing aircraft during a heading direction change of the vertical Fig and landing aircraft to a left side of the vertical take-off and landing aircraft and during a hovering movement of the vertical take-off and landing aircraft, consistent with one or more exemplary embodiments of the present disclosure. In an exemplary embodiment, during a heading direction change of vertical take-off and landing aircraft 100 to a left side of vertical take-off and landing aircraft 100, second engine 102b thrust setting may be controlled to decrease and first engine 102a thrust setting may be controlled to increase. Furthermore, in an exemplary embodiment, during a heading direction change of vertical take-off and landing aircraft 100 to the left side of vertical take-off and landing aircraft 100, first engine 102a exhaust duct nozzle may be controlled to be at 90 degrees.

Figure 11:
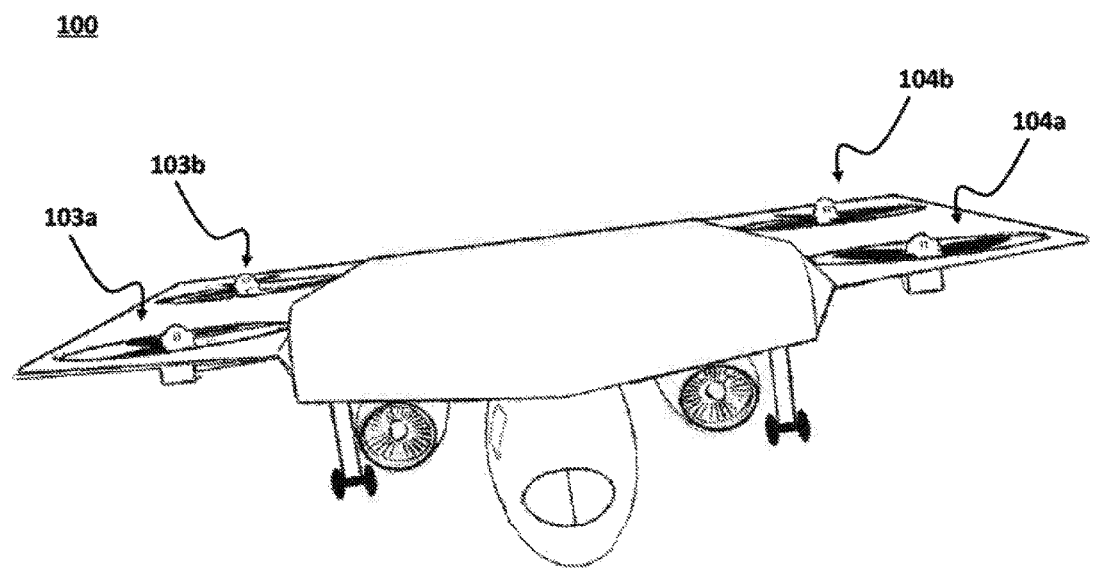
FIG. 11 illustrates an exemplary vertical take-off and landing aircraft during a heading direction change of the vertical take-off and landing aircraft to a right side of the vertical take-off and landing aircraft and during a hovering movement of the vertical take-off and landing aircraft, consistent with one or more exemplary embodiments of the present disclosure.

FIG. 11 shows an exemplary vertical take-off and landing aircraft during a heading direction change of the vertical take-off and landing aircraft to a right side of the vertical take-off and landing aircraft and during a hovering movement of the vertical take-off and landing aircraft, consistent with one or more exemplary embodiments of the present disclosure. In an exemplary embodiment, during a heading direction change of vertical take-off and landing aircraft 100 to a right side of vertical take-off and landing aircraft 100, first engine 102a thrust setting may be controlled to decrease and second engine 102b thrust setting may be controlled to increase. Furthermore, in an exemplary embodiment, during a heading direction change of vertical take-off and landing aircraft 100 to the right side of vertical take-off and landing aircraft 100, a second engine 102b exhaust duct nozzle may be controlled to be at 90 degrees.

Figure 12A:
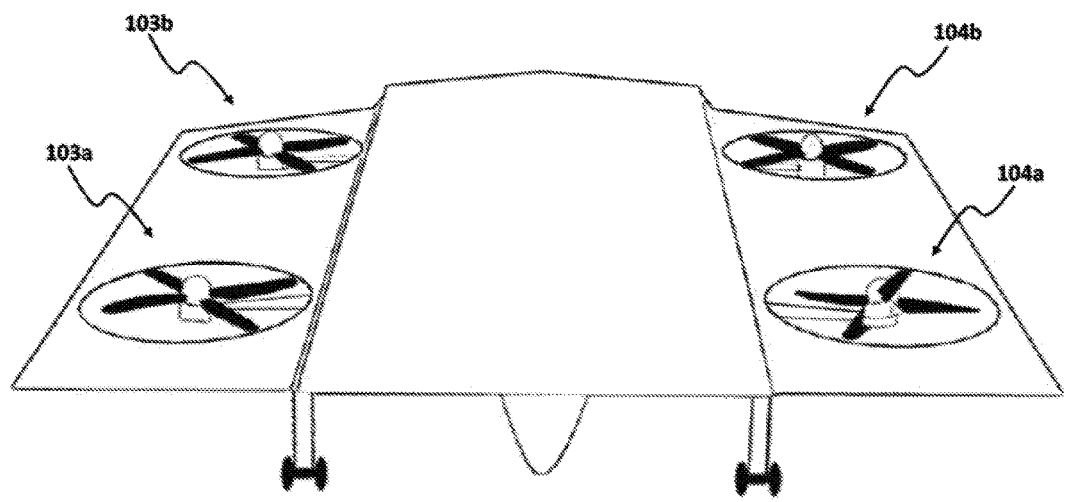
FIG. 12A illustrates an exemplary vertical take-off and landing aircraft during a counterclockwise spinning in a hovering mode, consistent with one or more exemplary embodiments of the present disclosure.
Figure 12B:
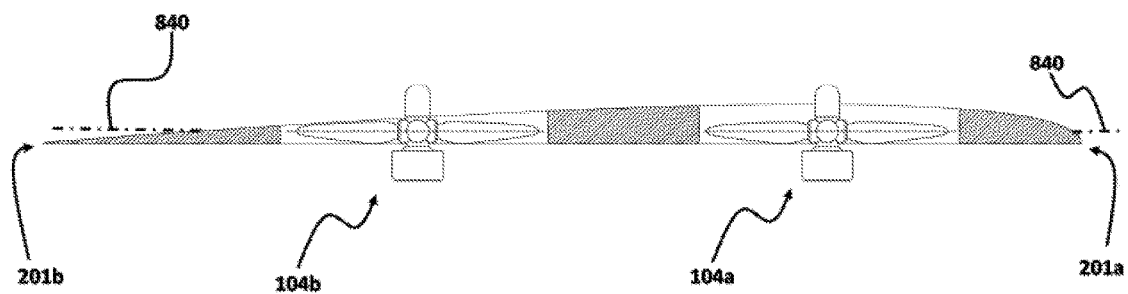
FIG. 12B illustrates a left view of a first set of propellers of an exemplary vertical take-off and landing aircraft during a counterclockwise spinning in a hovering mode, consistent with one or more exemplary embodiments of the present disclosure.
Figure 12C:
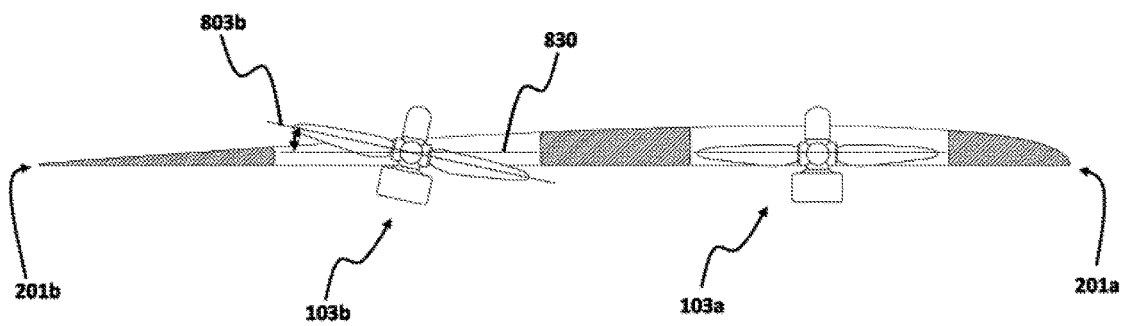
FIG. 12C illustrates a left view of a second set of propellers of an exemplary vertical take-off and landing aircraft during a counterclockwise spinning in a hovering mode, consistent with one or more exemplary embodiments of the present disclosure.

FIG. 12A shows an exemplary vertical take-off and landing aircraft during a counterclockwise spinning in a hovering mode, consistent with one or more exemplary embodiments of the present disclosure. FIG. 12B shows a left view of a first set of propellers of an exemplary vertical take-off and landing aircraft during a counterclockwise spinning in a hovering mode, consistent with one or more exemplary embodiments of the present disclosure. FIG. 12C shows a left view of a second set of propellers of an exemplary vertical take-off and landing aircraft during a counterclockwise spinning in a hovering mode, consistent with one or more exemplary embodiments of the present disclosure. As shown in FIG. 12A, FIG. 12B, and FIG. 12C, in an exemplary embodiment, during a counterclockwise spinning of vertical take-off and landing aircraft 100, the first tilt angle of first propeller 103a may be controlled to be at 0 degrees associated with first propeller 103a being in a horizontal position.

In an exemplary embodiment, during the counterclockwise spinning of vertical take-off and landing aircraft 100, the second tilt angle of second propeller 103b may be controlled to be at 5 degrees. In an exemplary embodiment, during the counterclockwise spinning of vertical take-off and landing aircraft 100, the third tilt angle of third propeller 104a may be controlled to be at 0 degrees associated with third propeller 104 being in the horizontal position. In an exemplary embodiment, during the counterclockwise spinning of vertical take-off and landing aircraft 100, the fourth tilt angle of fourth propeller 104b may be controlled to be at 0 degrees associated with fourth propeller 104b being in the horizontal position.

Figure 13A:
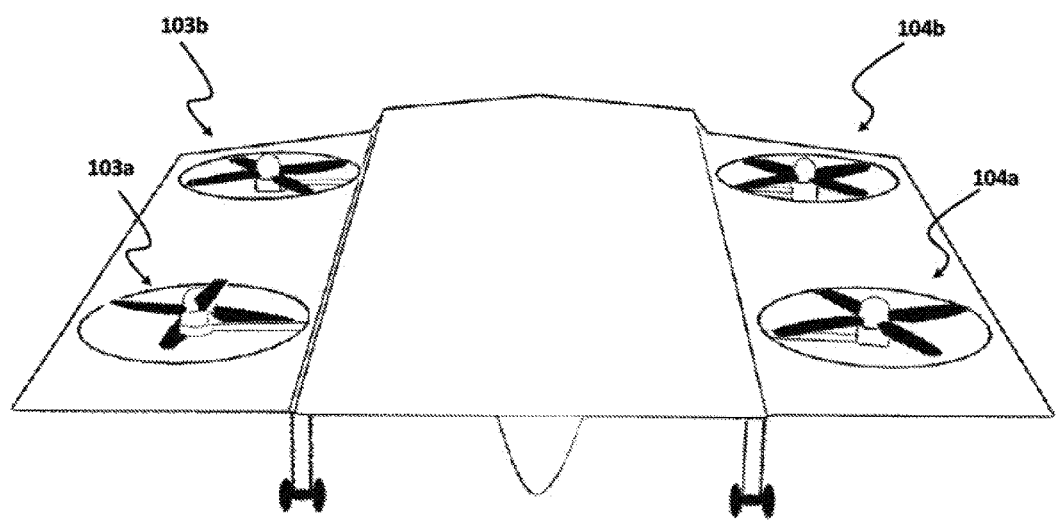
FIG. 13A illustrates an exemplary vertical take-off and landing aircraft during a clockwise spinning in a hovering mode, consistent with one or more exemplary embodiments of the present disclosure.
Figure 13B:
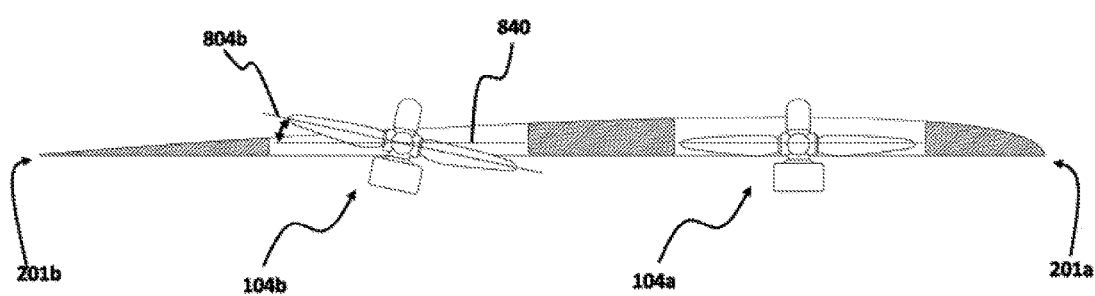
FIG. 13B illustrates a left view of a second set of propellers of an exemplary vertical take-off and landing aircraft during a clockwise spinning in a hovering mode, consistent with one or more exemplary embodiments of the present disclosure.
Figure 13C:
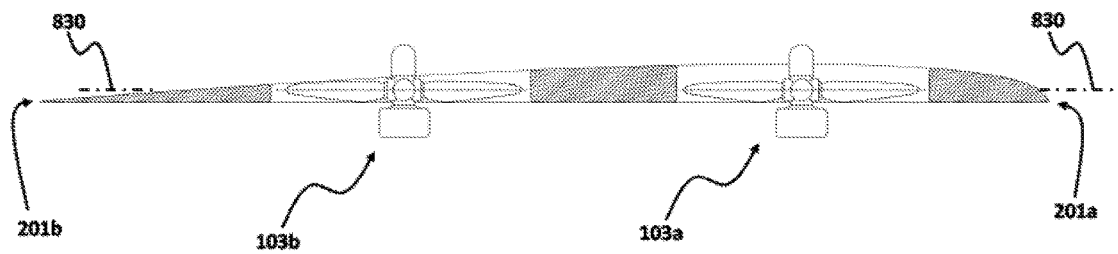
FIG. 13C illustrates a left view of a first set of propellers of an exemplary vertical take-off and landing aircraft during a clockwise spinning in a hovering mode, consistent with one or more exemplary embodiments of the present disclosure.

FIG. 13A shows an exemplary vertical take-off and landing aircraft during a clockwise spinning in a hovering mode, consistent with one or more exemplary embodiments of the present disclosure. FIG. 13B shows a left view of a first set of propellers of an exemplary vertical take-off and landing aircraft during a clockwise spinning in a hovering mode, consistent with one or more exemplary embodiments of the present disclosure. FIG. 13C shows a left view of a second set of propellers of an exemplary vertical take-off and landing aircraft during a clockwise spinning in a hovering mode, consistent with one or more exemplary embodiments of the present disclosure. As shown in FIG. 13A, FIG. 13B, and FIG. 13C, in an exemplary embodiment, during a clockwise spinning of vertical take-off and landing aircraft 100, the first tilt angle of first propeller 103a may be controlled to be at 0 degrees associated with first propeller 103a being in a horizontal position.

In an exemplary embodiment, during the clockwise spinning of vertical take-off and landing aircraft 100, the second tilt angle of second propeller 103b may be controlled to be at 0 degrees associated with second propeller 103b being in a horizontal position. In an exemplary embodiment, during the clockwise spinning of vertical take-off and landing aircraft 100, the third tilt angle of third propeller 104a may be controlled to be at 0 degrees associated with third propeller 104a being in the horizontal position. In an exemplary embodiment, during the clockwise spinning of vertical take-off and landing aircraft 100, the fourth tilt angle of fourth propeller 104b may be controlled to be at 5 degrees.

Figure 14A:
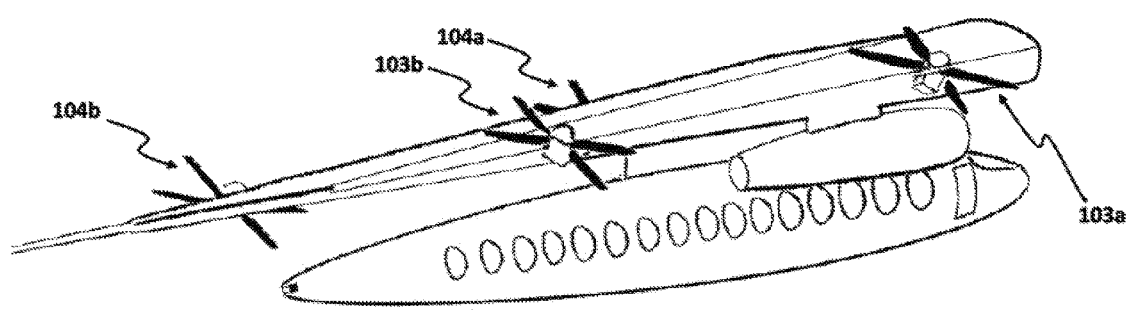
FIG. 14A illustrates an exemplary vertical take-off and landing aircraft during an ascent mode, consistent with one or more exemplary embodiments of the present disclosure.
Figure 14B:
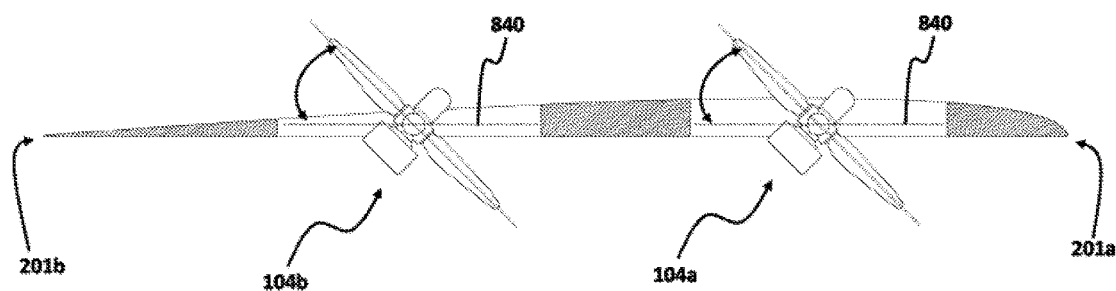
FIG. 14B illustrates a left view of a second set of propellers of an exemplary vertical take-off and landing aircraft during an ascent mode, consistent with one or more exemplary embodiments of the present disclosure.
Figure 14C:
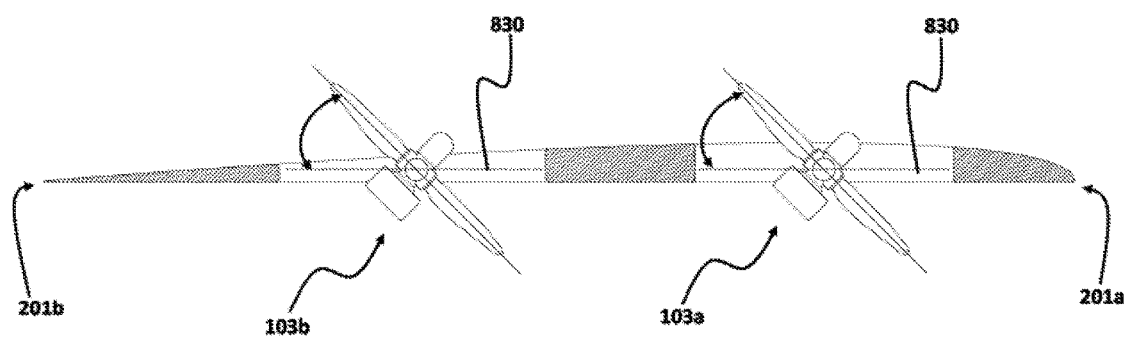
FIG. 14C illustrates a left view of a first set of propellers of an exemplary vertical take-off and landing aircraft during an ascent mode, consistent with one or more exemplary embodiments of the present disclosure.

FIG. 14A shows an exemplary vertical take-off and landing aircraft during an ascent mode, consistent with one or more exemplary embodiments of the present disclosure. FIG. 14B shows a left view of a second set of propellers of an exemplary vertical take-off and landing aircraft during an ascent mode, consistent with one or more exemplary embodiments of the present disclosure. FIG. 14C shows a left view of a first set of propellers of an exemplary vertical take-off and landing aircraft during an ascent mode, consistent with one or more exemplary embodiments of the present disclosure. As shown in FIG. 14A, FIG. 14B, and FIG. 14C, in an exemplary embodiment, during an ascent movement of vertical take-off and landing aircraft 100, the first tilt angle of first propeller 103a, the second tilt angle of second propeller 103b, the third tilt angle of third propeller 104a, and the fourth tilt angle of fourth propeller 104b may be controlled to be at 45 degrees.

Figure 15A:
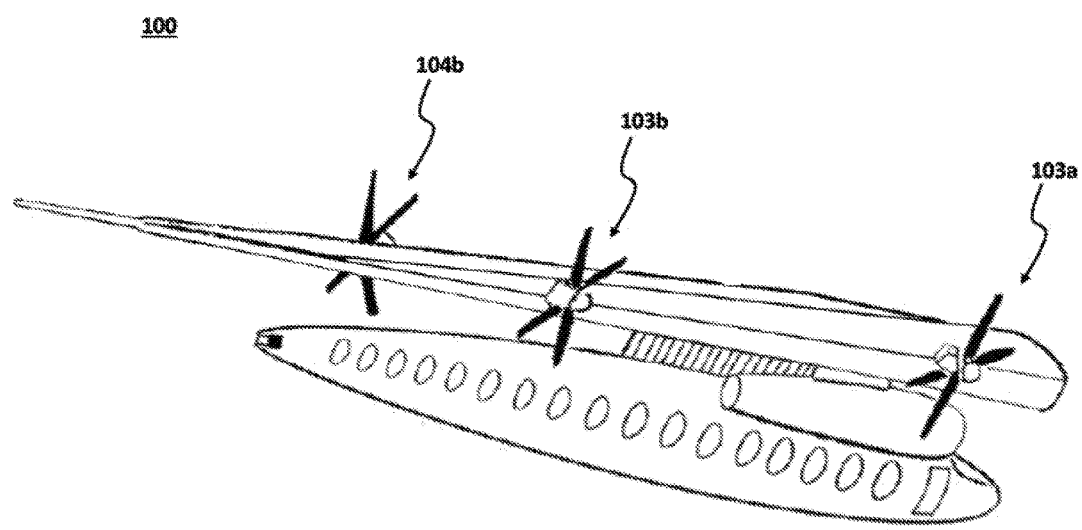
FIG. 15A illustrates an exemplary vertical take-off and landing aircraft during a descent mode, consistent with one or more exemplary embodiments of the present disclosure.
Figure 15B:
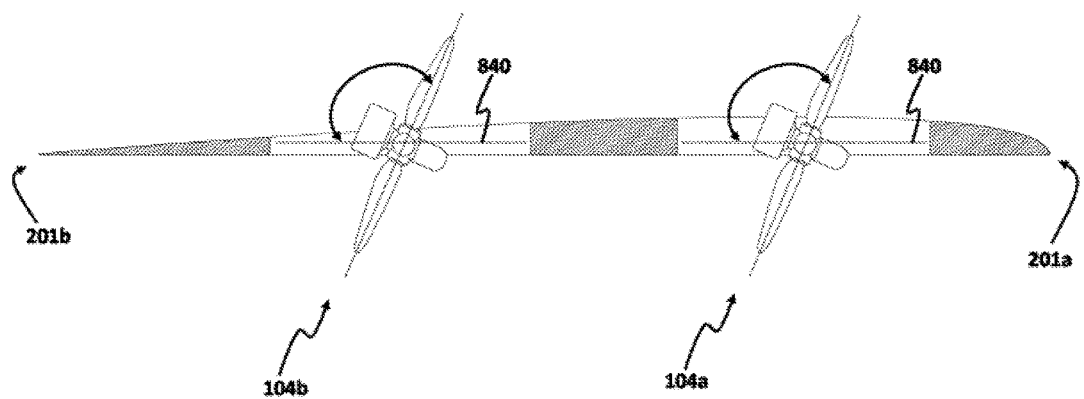
FIG. 15B illustrates a left view of a second set of propellers of an exemplary vertical take-off and landing aircraft during a descent mode, consistent with one or more exemplary embodiments of the present disclosure.
Figure 15C:
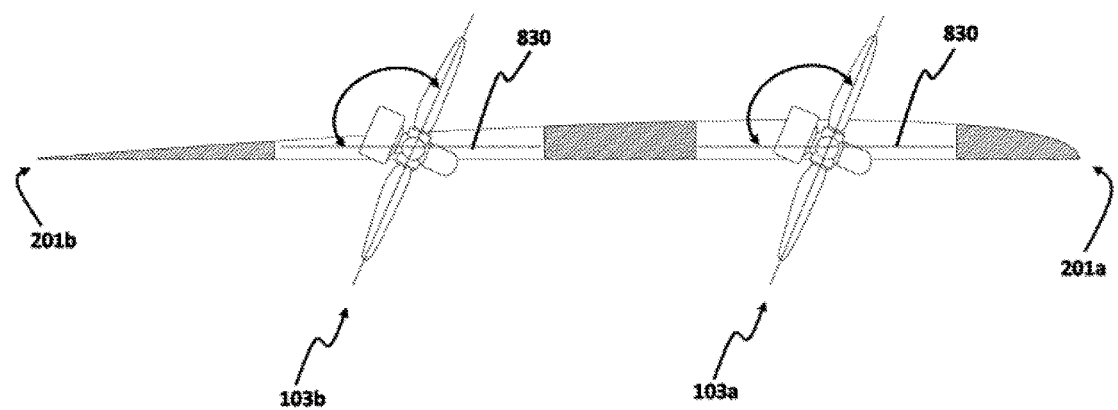
FIG. 15C illustrates a left view of a first set of propellers of an exemplary vertical take-off and landing aircraft during a descent mode, consistent with one or more exemplary embodiments of the present disclosure.

FIG. 15A shows an exemplary vertical take-off and landing aircraft during a descent mode, consistent with one or more exemplary embodiments of the present disclosure. FIG. 15B shows a left view of a second set of propellers of an exemplary vertical take-off and landing aircraft during a descent mode, consistent with one or more exemplary embodiments of the present disclosure. FIG. 15C shows a left view of a first set of propellers of an exemplary vertical take-off and landing aircraft during a descent mode, consistent with one or more exemplary embodiments of the present disclosure. As shown in FIG. 14A, FIG. 14B, and FIG. 14C, in an exemplary embodiment, during a descent movement of vertical take-off and landing aircraft 100, the first tilt angle of first propeller 103a, the second tilt angle of second propeller 103b, the third tilt angle of third propeller 104a, and the fourth tilt angle of fourth propeller 104b may be controlled to be at 110 degrees.

Figure 16A:
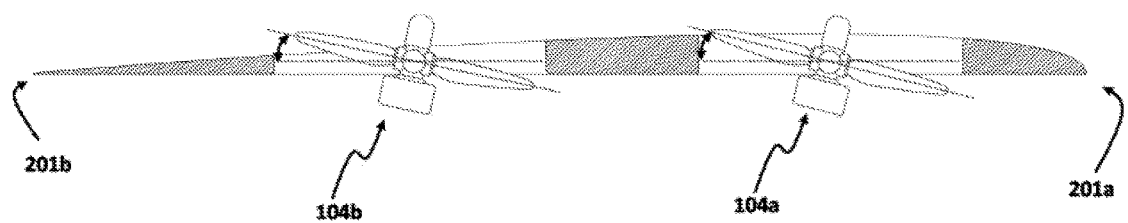
FIG. 16A illustrates a left view of a second set of propellers of an exemplary vertical take-off and landing aircraft during a forward movement in a hovering mode, consistent with one or more exemplary embodiments of the present disclosure.
Figure 16B:
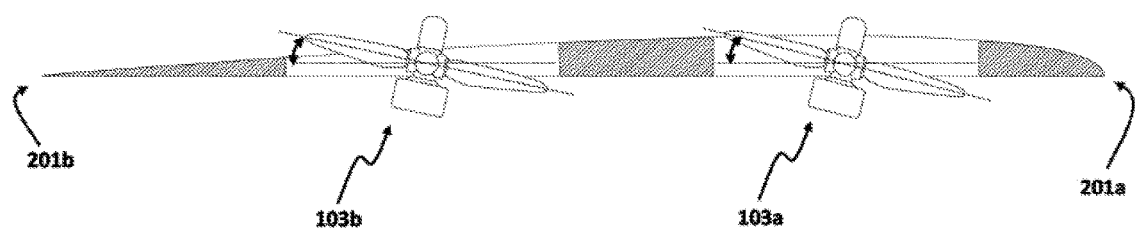
FIG. 16B illustrates a left view of a first set of propellers of an exemplary vertical take-off and landing aircraft during a forward movement in a hovering mode, consistent with one or more exemplary embodiments of the present disclosure.

FIG. 16A shows a left view of a second set of propellers of an exemplary vertical take-off and landing aircraft during a forward movement in a hovering mode, consistent with one or more exemplary embodiments of the present disclosure. FIG. 16B shows a left view of a first set of propellers of an exemplary vertical take-off and landing aircraft during a forward movement in a hovering mode, consistent with one or more exemplary embodiments of the present disclosure. As shown in FIG. 15A and FIG. 15B, in an exemplary embodiment, during a forward movement of vertical take-off and landing aircraft 100 in a hovering mode, the first tilt angle of first propeller 103a, the second tilt angle of second propeller 103b, the third tilt angle of third propeller 104a, and the fourth tilt angle of fourth propeller 104b may be controlled to be at 3 degrees.

Figure 17A:
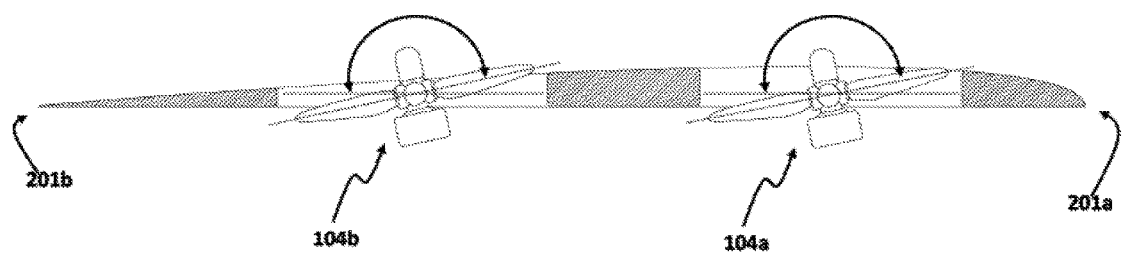
FIG. 17A illustrates a left view of a second set of propellers of an exemplary vertical take-off and landing aircraft during a backward movement in a hovering mode, consistent with one or more exemplary embodiments of the present disclosure.
Figure 17B:
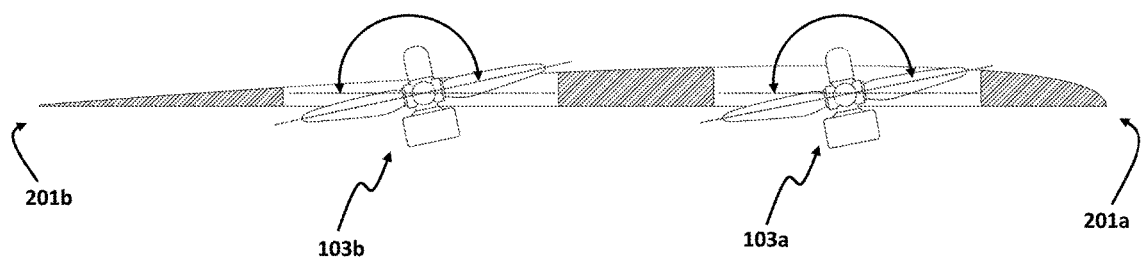
FIG. 17B illustrates a left view of a first set of propellers of an exemplary vertical take-off and landing aircraft during a backward movement in a hovering mode, consistent with one or more exemplary embodiments of the present disclosure.
Figure 18:
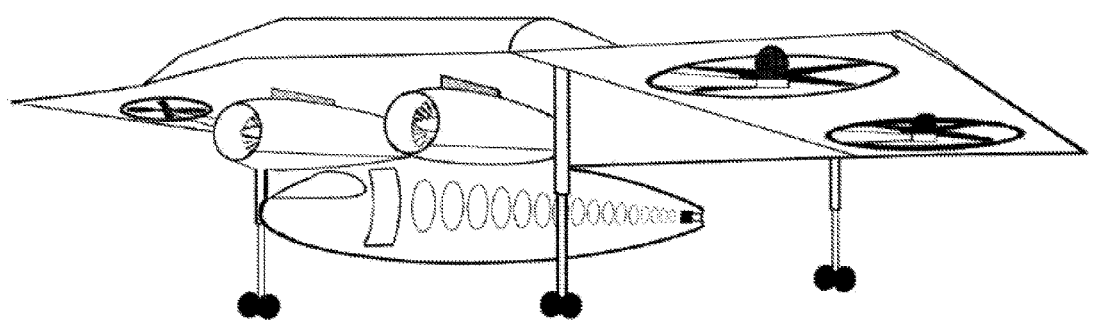
FIG. 18 illustrates an exemplary vertical take-off and landing aircraft during a landing mode (touch down), consistent with one or more exemplary embodiments of the present disclosure.

FIG. 17A shows a left view of a second set of propellers of an exemplary vertical take-off and landing aircraft during a backward movement in a hovering mode, consistent with one or more exemplary embodiments of the present disclosure. FIG. 16B shows a left view of a first set of propellers of an exemplary vertical take-off and landing aircraft during a backward movement in a hovering mode, consistent with one or more exemplary embodiments of the present disclosure. As shown in FIG. 15A and FIG. 15B, in an exemplary embodiment, during a backward movement of vertical take-off and landing aircraft 100 in a hovering mode, the first tilt angle of first propeller 103a, the second tilt angle of second propeller 103b, the third tilt angle of third propeller 104a, and the fourth tilt angle of fourth propeller 104b may be controlled to be at 177 degrees.

Other advantages the vertical take-off and landing aircraft described herein can provide include minimizing critical situations of the flight. For purpose of reference, it should be understood that ailerons, flaps, elevators, rudders, horizontal stabilizers, vertical stabilizer, thrust reserves, and spoilers of an airplane may negatively impact flight conditions of the airplane. But the disclosed vertical take-off and landing aircraft does not include ailerons, flaps, elevators, rudders, horizontal stabilizers, vertical stabilizer, thrust reserves, and spoilers, and consequently, critical situations of the flight may be reduced and flight conditions may be improved significantly. Furthermore, in typical airplanes, a fuselage may be placed between two lateral wings and an empennage. In this configuration, vibrations of the two lateral wings and the empennage may be transferred to the fuselage. But, in the disclosed vertical take-off and landing aircraft, a fuselage may be installed under a single integrated wing utilizing a fuselage pylon consisting of some strong robust shock absorbers. Hence the wing vibrations cannot be transferred to the fuselage easily. Furthermore, due to the absence of an empennage, an aileron, and a flap in the disclosed vertical take-off and landing aircraft, the flight cost and the maintenance cost of the vertical take-off and landing aircraft may decrease considerably.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

The invention claimed is:

1. A vertical take-off and landing (VTOL) airplane, comprising:
   a single wing made of spars, ribs and sheet metal;
   a plurality of engines, comprising:
      a first engine mounted to a first side of the single wing; and
      a second engine mounted to a second side of the single wing;
   a first set of propellers on the first side of the single wing;
   a second set of propellers on the second side of the single wing;
   a first power transfer unit, comprising:
      a first taper tube assembly connected to:
         a first propeller of the first set of propellers; and
         a first power shaft of the first engine; and
      a second taper tube assembly connected to:
         a second propeller of the first set of propellers; and
         a first shaft assembly connected to the first power shaft;
   a second power transfer unit, comprising:
      a third taper tube assembly connected to:
         a third propeller of the second set of propellers; and
         a second power shaft of the second engine; and
      a fourth taper tube assembly connected to:
         a fourth propeller of the second set of propellers; and
         a second shaft assembly connected to the second power shaft;
   landing gear connected to the single wing; and
   a fuselage connected under the single wing, wherein the fuselage comprises an auxiliary power unit (APU) configured to provide electric and pneumatic energy to the VTOL vehicle.

2. The VTOL vehicle of claim 1, wherein:
   the first engine is mounted to the first side of the single wing via a first pylon comprising a first shock damper system;
   the first pylon is configured to suppress vibrations of the first engine on the single wing;
   the second engine is mounted to the second side of the single wing via a second pylon comprising a second shock damper system; and
   the second pylon is configured to suppress vibrations of the second engine on the single wing.

3. The VTOL vehicle of claim 1, wherein:
   the fuselage is connected under the single wing via a pylon comprising a shock damper system; and
   the pylon is configured to suppress vibrations of the single wing on the fuselage.

4. The VTOL vehicle of claim 1, wherein:
   the first engine of the plurality of engines comprises a first turboshaft engine with the capability to produce the %20 of engine thrust via engine exhaust duct nozzle, in addition the exhaust duct nozzle can rotate over an angular of 90 degrees during takeoff, hovering, heading direction change, landing, and jamming to improve vertical thrust;
   the second engine of the plurality of engines comprises a second turboshaft engine with the capability to produce the %20 of engine thrust via engine exhaust duct nozzle, in addition the exhaust duct nozzle can rotate over an angular of 90 degrees during takeoff, hovering, heading direction change, landing, and jamming to improve vertical thrust.

5. The VTOL vehicle of claim 1, wherein:
the first taper tube assembly comprises:
 a first taper tube;
 a first gearbox connected to the first power shaft of the first engine;
 a second gearbox connected to the first propeller;
 a first inner shaft, comprised within the first taper tube, connected to the first gearbox and the second gearbox, wherein the first gearbox, the second gearbox and the first inner shaft are configured to transfer power from the first power shaft of the first engine to the first propeller in order to run the first propeller;
 a first stepper motor configured to control a first tilt angle of the first propeller by controlling a first angular position of the first taper tube; and
 one or more first brakes configured to secure the first angular position of the first taper tube; and
the second taper tube assembly comprises:
 a second taper tube;
 a third gearbox connected to the first shaft assembly;
 a fourth gearbox connected to the second propeller;
 a second inner shaft, comprised within the second taper tube, connected to the third gearbox and the fourth gearbox, wherein the third gearbox, the fourth gearbox and the second inner shaft are configured to transfer power from the first shaft assembly to the second propeller in order to run the second propeller,
 a second stepper motor configured to control a second tilt angle of the second propeller by controlling a second angular position of the second taper tube; and
 one or more second brakes configured to secure the second angular position of the second taper tube.

6. The VTOL vehicle of claim 5, wherein:
the third taper tube assembly comprises:
 a third taper tube;
 a fifth gearbox connected to the second power shaft of the second engine;
 a sixth gearbox connected to the third propeller;
 a third inner shaft, comprised within the third taper tube, connected to the fifth gearbox and the sixth gearbox, wherein the fifth gearbox, the sixth gearbox and the third inner shaft are configured to transfer power from the second power shaft of the second engine to the third propeller in order to run the third propeller;
 a third stepper motor configured to control a third tilt angle of the third propeller by controlling a third angular position of the third taper tube; and
 one or more third brakes configured to secure the third angular position of the third taper tube; and
the fourth taper tube assembly comprises:
 a fourth taper tube;
 a seventh gearbox connected to the second shaft assembly,
 an eighth gearbox connected to the fourth propeller,
 a fourth inner shaft, comprised within the fourth taper tube, connected to the seventh gearbox and the eighth gearbox, wherein the seventh gearbox, the eighth gearbox and the fourth inner shaft are configured to transfer power from the second shaft assembly to the fourth propeller in order to run the fourth propeller;
 a fourth stepper motor configured to control a fourth tilt angle of the fourth propeller by controlling a fourth angular position of the fourth taper tube; and
 one or more fourth brakes configured to secure the fourth angular position of the fourth taper tube.

7. The VTOL vehicle of claim 6, comprising:
 a first lever configured to control the first stepper motor and the first tilt angle of the first propeller;
 a second lever configured to control the second stepper motor and the second tilt angle of the second propeller;
 a third lever configured to control the third stepper motor and the third tilt angle of the third propeller; and
 a fourth level configured to control the fourth stepper motor and the fourth tilt angle of the fourth propeller.

8. The VTOL vehicle of claim 6, wherein the first tilt angle of the first propeller, the second tilt angle of the second propeller, the third tilt angle of the third propeller and the fourth tilt angle of the fourth propeller may be controlled to perform take-off, ascent, cruise, descend, hovering movements and landing of the VTOL vehicle.

9. The VTOL vehicle of claim 6, wherein during take-off, hovering and landing of the VTOL vehicle:
 the first tilt angle of the first propeller is controlled to be at 0 degrees associated with the first propeller being in a horizontal position;
 the second tilt angle of the second propeller is controlled to be at 0 degrees associated with the second propeller being in the horizontal position;
 the third tilt angle of the third propeller is controlled to be at 0 degrees associated with the third propeller being in the horizontal position; and
 the fourth tilt angle of the fourth propeller is controlled to be at 0 degrees associated with the fourth propeller being in the horizontal position.

10. The VTOL vehicle of claim 6, wherein during cruise of the VTOL vehicle:
 the first tilt angle of the first propeller is controlled to be at 90 degrees associated with the first propeller being in a vertical position;
 the second tilt angle of the second propeller is controlled to be at 90 degrees associated with the second propeller being in the vertical position;
 the third tilt angle of the third propeller is controlled to be at 90 degrees associated with the third propeller being in the vertical position; and
 the fourth tilt angle of the fourth propeller is controlled to be at 90 degrees associated with the fourth propeller being in the vertical position.

11. The VTOL vehicle of claim 6, wherein a thrust of the VTOL vehicle is controlled by controlling:
 a first blade pitch angle associated with first blades of the first propeller;
 a second blade pitch angle associated with second blades of the second propeller,
 a third blade pitch angle associated with third blades of the third propeller; and
 a fourth blade pitch angle associated with fourth blades of the fourth propeller.

12. The VTOL vehicle of claim 11, wherein during cruise of the VTOL vehicle:
 controlling the first blade pitch angle to be at a first angle;
 controlling the second blade pitch angle to be at the first angle;
 controlling the third blade pitch angle to be at the first angle; and
 controlling the fourth blade pitch angle to be at the first angle.

13. The VTOL vehicle of claim 12, wherein during take-off of the VTOL vehicle:
controlling the first blade pitch angle to be at a second angle;
controlling the second blade pitch angle to be at the second angle;
controlling the third blade pitch angle to be at the second angle; and
controlling the fourth blade pitch angle to be at the second angle.

14. The VTOL vehicle of claim 3, wherein the first angle is higher than the second angle.

15. The VTOL vehicle of claim 14, wherein:
the first blade pitch angle may be controlled by controlling a ninth gearbox connected to the first propeller;
the second blade pitch angle may be controlled by controlling a tenth gearbox connected to the second propeller;
the third blade pitch angle may be controlled by controlling an eleventh gearbox connected to the third propeller, and
the fourth blade pitch angle may be controlled by controlling a twelfth gearbox connected to the fourth propeller.

16. The VTOL vehicle of claim 6, wherein responsive to failure of the second engine:
the first tilt angle of the first propeller is controlled to be at 0 degrees associated with the first propeller being in a horizontal position;
the second tilt angle of the second propeller is controlled to be at 0 degrees associated with the second propeller being in the horizontal position;
the third tilt angle of the third propeller is controlled to be at 0 degrees associated with the third propeller being in the horizontal position;
the fourth tilt angle of the fourth propeller is controlled to be at 0 degrees associated with the fourth propeller being in the horizontal position; and
the first engine is used to run the third propeller and the fourth propeller using a first clutch connected to the first taper tube assembly, a second clutch connected to the second taper tube assembly and an inverter connected to the first clutch and the second clutch via one or more shafts within one or more conduits.

17. The VTOL vehicle of claim 1, wherein:
blades of the first propeller rotate in a first direction;
blades of the second propeller rotate in the first direction;
blades of the third propeller rotate in a second direction, opposite the first direction; and
blades of the fourth propeller rotate in the second direction.

18. The VTOL vehicle of claim 1, wherein the VTOL vehicle is a VTOL airplane.

19. A vertical take-off and landing (VTOL) airplane, comprising:
a single wing;
a plurality of engines, comprising:
a first engine mounted to a first side of the single wing; and
a second engine mounted to a second side of the single wing;
a first set of propellers on the first side of the single wing;
a second set of propellers on the second side of the single wing;
a first power transfer unit, comprising:
a first taper tube assembly connected to:
a first propeller of the first set of propellers; and
a first power shaft of the first engine; and
a second taper tube assembly connected to:
a second propeller of the first set of propellers; and
a first shaft assembly connected to the first power shaft; and
a second power transfer unit, comprising:
a third taper tube assembly connected to:
a third propeller of the second set of propellers; and
a second power shaft of the second engine; and
a fourth taper tube assembly connected to:
a fourth propeller of the second set of propellers; and
a second shaft assembly connected to the second power shaft.

20. A vertical take-off and landing (VTOL) airplane, comprising:
a single wing made of spars, ribs and sheet metal;
a first turboshaft engine mounted to a first side of the single wing; and
a second turboshaft engine mounted to a second side of the single wing;
a first propeller on the first side of the single wing;
a second propeller on the first side of the single wing
a third propeller on the second side of the single wing;
a fourth propeller on the second side of the single wing;
a first power transfer unit, comprising:
a first taper tube assembly connected to:
the first propeller; and
a first power shaft of the first turboshaft engine; and
a second taper tube assembly connected to:
the second propeller; and
a first shaft assembly connected to the first power shaft;
a second power transfer unit, comprising:
a third taper tube assembly connected to:
the third propeller; and
a second power shaft of the second turboshaft engine; and
a fourth taper tube assembly connected to:
the fourth propeller; and
a second shaft assembly connected to the second power shaft;
landing gear connected to the single wing; and
a fuselage connected to the single wing, wherein the fuselage comprises an auxiliary power unit (APU) configured to provide electric and pneumatic energy to the VTOL vehicle.

* * * * *